United States Patent
Yagyu et al.

[11] Patent Number: 6,067,499
[45] Date of Patent: May 23, 2000

[54] ROUTE SELECTION SYSTEM AND METHOD UTILIZING INTEGRATED CROSSINGS, A STARTING ROUTE, AND/OR ROUTE NUMBERS

[75] Inventors: Takeshi Yagyu, Osaka; Yoshiki Ueyama, Sakai; Makoto Fushimi, Katano; Yasuhiro Nakamura, Yokohama, all of Japan

[73] Assignee: Matsushita Electric Industrial Co., Ltd., Osaka, Japan

[21] Appl. No.: 08/523,865

[22] Filed: Sep. 8, 1995

[30] Foreign Application Priority Data

| Sep. 8, 1994 | [JP] | Japan | 6-214469 |
| Nov. 11, 1994 | [JP] | Japan | 6-277573 |
| Feb. 20, 1995 | [JP] | Japan | 7-030478 |

[51] Int. Cl.$^7$ .................................................. G06F 19/00
[52] U.S. Cl. ............................................ 701/201; 701/209
[58] Field of Search .............................. 364/449.3, 449.6, 364/460, 424.027, 424.029, 443, 444.1, 444.2; 340/995; 701/23, 25, 200, 201, 202, 208, 209, 210, 211, 212

[56] References Cited

U.S. PATENT DOCUMENTS

| 4,926,336 | 5/1990 | Yamada .................................. 364/444 |
| 4,962,458 | 10/1990 | Verstraete .............................. 364/443 |
| 4,984,168 | 1/1991 | Neukrichner et al. .................. 364/449 |
| 5,031,104 | 7/1991 | Ikeda et al. ............................ 364/449 |
| 5,168,452 | 12/1992 | Yamada et al. ........................ 364/444 |
| 5,184,303 | 2/1993 | Link . | |

(List continued on next page.)

FOREIGN PATENT DOCUMENTS

| 0 330 787 | 9/1989 | European Pat. Off. . |
| 0 346 492 | 12/1989 | European Pat. Off. . |
| 0485120 | 5/1992 | European Pat. Off. . |
| 0504854 | 9/1992 | European Pat. Off. . |
| 39 05 493 | 8/1990 | Germany . |
| 59-105113 | 6/1984 | Japan . |
| 2-56591 | 2/1990 | Japan . |
| 4-29013 | 1/1992 | Japan . |
| 4-365088 | 12/1992 | Japan . |
| 5-53500 | 3/1993 | Japan . |
| 05165406 | 7/1993 | Japan . |
| 2271423 | 4/1994 | United Kingdom . |

OTHER PUBLICATIONS

Claussen et al., GDF, "A Proposed Standard for Digital Road Maps to be Used in Car Navigation Systems", Proceedings of the Vehicle Navigation and Information Systems Conference, Toronto, Sep. 11–13, 1989, pp. 324–330.

Aho, Alfred V. *Data Structure and Algorithm* Trans. Yoshio Ono. Kabushiki Kaisha Baifu–Kan, pp. 179–183.

*Primary Examiner*—William A. Cuchlinski, Jr.
*Assistant Examiner*—Edward Pipala
*Attorney, Agent, or Firm*—Wenderoth, Lind & Ponack, L.L.P.

[57] ABSTRACT

A route selection data storage unit 7 stores route selection data which are created from original data describing a detailed road system. When a plurality of crossings and a plurality of roads which are expressed on the road system in the original data satisfy prescribed conditions, these crossings and roads are integrated with each other respectively and recorded in the route selection data. The route selection data include a passage link table, so that links which are deleted by integration of the crossings are not missed. The passage link table records links which are deleted due to the integration of the crossings but passed in practice with reference to approach and escape links as to the respective crossings integrated with each other. An optimum route search unit 6 searches for the optimum route between a starting place and a destination which are designated by a position detection unit and/or a spot input unit 5 through the route selection data. When the optimum route obtained through the search passes through the integrated crossings, the optimum route search unit 6 supplements the deleted links with corresponding passage links recorded in the passage link table.

43 Claims, 25 Drawing Sheets

U.S. PATENT DOCUMENTS

| | | | |
|---|---|---|---|
| 5,291,413 | 3/1994 | Tamai et al. . | |
| 5,291,414 | 3/1994 | Tamai et al. | 364/449 |
| 5,402,120 | 3/1995 | Fuji et al. | 340/988 |
| 5,430,653 | 7/1995 | Inoue . | |
| 5,469,360 | 11/1995 | Ihara et al. | 364/449 |
| 5,471,393 | 11/1995 | Bolger | 364/443 |
| 5,475,598 | 12/1995 | Fushimi et al. | 364/444 |
| 5,486,822 | 1/1996 | Tenmoku et al. . | |
| 5,502,640 | 3/1996 | Yagyu et al. | 364/443 |
| 5,519,619 | 5/1996 | Seda . | |
| 5,568,390 | 10/1996 | Hirota et al. | 364/449 |
| 5,583,494 | 12/1996 | Mizutani et al. | 340/995 |
| 5,587,911 | 12/1996 | Asano et al. | 364/444.2 |
| 5,610,821 | 3/1997 | Gazis et al. | 364/444.2 |
| 5,712,788 | 1/1998 | Liaw et al. | 701/209 |

FIG. 3A
FIG. 3B
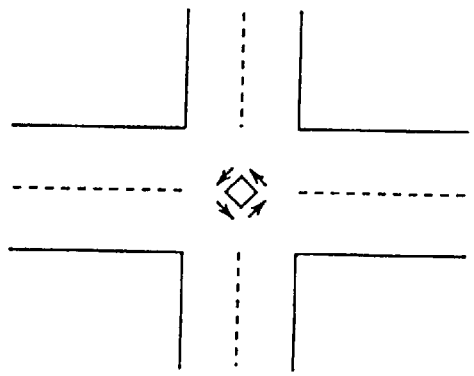
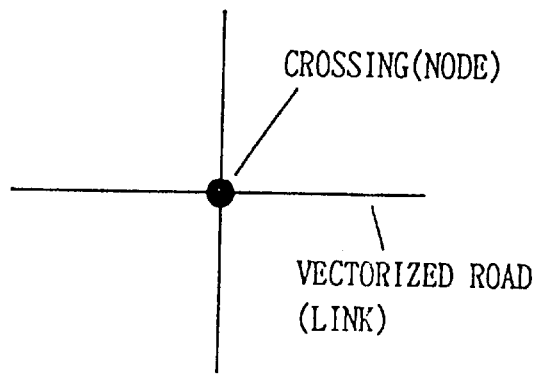
CROSSING(NODE)
VECTORIZED ROAD (LINK)
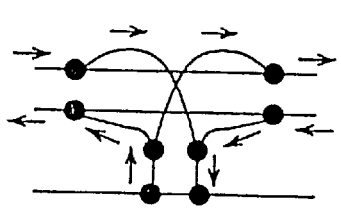
INTERCHANGE
FIG. 4A
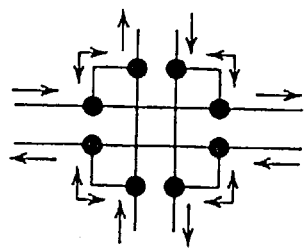
OVERHEAD CROSSING
FIG. 4B
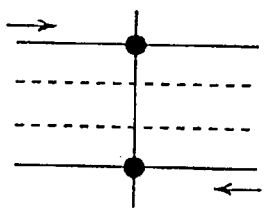
SIDEWAY OF HIGHWAY etc.
FIG. 4C

REGION 1 | REGION 2

ORIGINAL DATA

| REGION | LINK | | TRAFFIC INFORMATION PROVISION NUMBER |
|---|---|---|---|
| | START NODE | END NODE | |
| REGION 1 | A | B | 1 |
| | B | A | 2 |
| | B | C | 3 |
| | C | B | 4 |
| | C | D | 5 |
| | D | C | 6 |
| REGION 2 | D | E | 1 |
| | E | D | 2 |

TRAFFIC INFORMATION DATA

| REGION | TRAFFIC INFORMATION PROVISION NUMBER | DEGREE OF CONGESTION |
|---|---|---|
| 1 | 1 | 0 |
| 1 | 2 | 1 |
| 1 | 3 | 1 |
| 1 | 4 | 3 |
| 1 | 5 | 0 |
| 1 | 6 | 2 |
| 2 | 1 | 0 |
| 2 | 2 | 0 |

0 : NOT CONGESTED
1 : SLIGHTLY CROWDED
2 : CROWDED
3 : CONGESTED

FIG. 6A
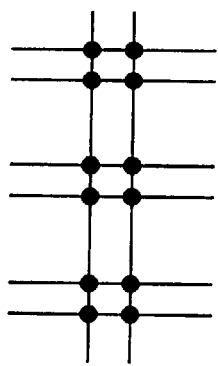
FIG. 6B
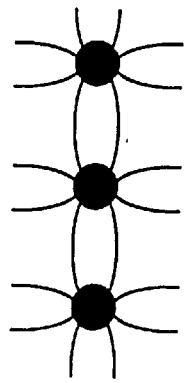
FIG. 6C
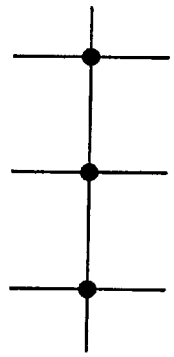
FIG. 7A
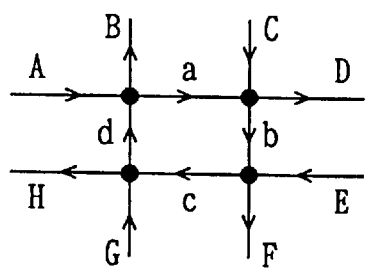
FIG. 7B
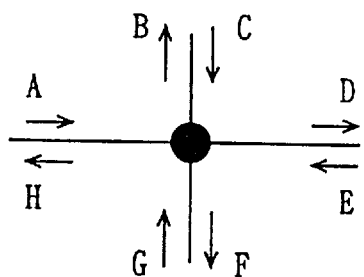
FIG. 7C
| APPROACH LINK | ESCAPE LINK | PASSAGE LINK | COST |
|---|---|---|---|
| A | B | - | - |
|   | D | a | 10 |
|   | F | a, b | 15 |
| C | D | - | - |
|   | F | b | 5 |
|   | H | b, c | 15 |
| E | F | - | - |
|   | H | c | 10 |
|   | B | c, d | 15 |
| G | H | - | - |
|   | B | d | 5 |
|   | D | d, a | 15 |

FIG. 8A
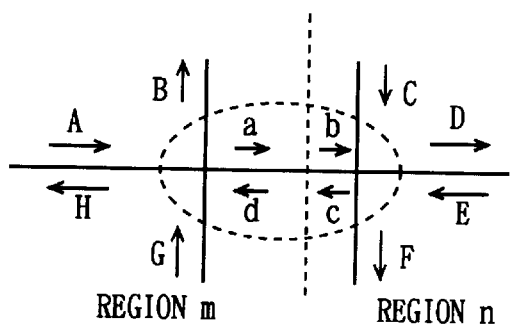
FIG. 8C
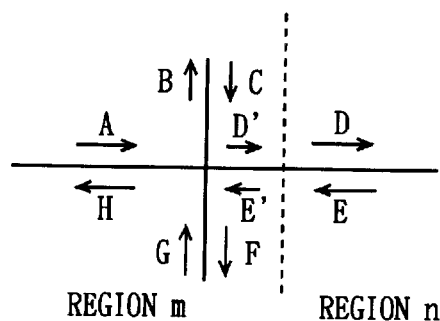
FIG. 8B
NOT INTEGRATED
| REGION | LINK | TRAFFIC INFORMATION PROVISION NUMBER |
|---|---|---|
| REGION m | A | 1 |
| | B | - |
| | G | - |
| | H | 2 |
| | a | 3 |
| | d | 4 |
| REGION n | C | - |
| | D | 3 |
| | E | 4 |
| | F | - |
| | b | 1 |
| | c | 2 |
FIG. 8D
INTEGRATED
| REGION | LINK OR APPROACH LINK | ESCAPE LINK | PASSAGE LINK | TRAFFIC INFORMATION REGION·PROVISION NUMBER | COST |
|---|---|---|---|---|---|
| REGION m | A | - | - | m1 | 60 |
| | B | - | - | - | - |
| | D' | ma,nb | m3,n1 | 5 | |
| | F | ma,nb | m3,n1 | 5 | |
| | B | - | - | - | 45 |
| | C | - | - | - | 45 |
| | D' | - | - | - | - |
| | F | - | - | - | - |
| | H | nc,md | n2,m4 | 5 | |
| | D' | - | - | - | 0 |
| | E' | - | - | - | 0 |
| | F | - | - | - | - |
| | H | nc,md | n2,m4 | 5 | |
| | B | nc,md | n2,m4 | 5 | |
| | F | - | - | - | 50 |
| | G | - | - | - | 50 |
| | H | - | - | - | - |
| | B | - | - | - | - |
| | D' | ma,nb | m3,n1 | 5 | |
| | H | - | - | m2 | 60 |
| REGION n | D | - | - | n3 | 70 |
| | E | - | - | n4 | 70 |

FIG. 13

| | CROSSING INTEGRATION PATTERN | ROAD SYSTEM BEFORE INTEGRATION | ROAD SYSTEM AFTER INTEGRATION |
|---|---|---|---|
| (A) | INTEGRATE WITH OMISSION OF ROADS OF NOT MORE THAN CONSTANT DISTANCE | | |
| (B) | INTEGRATE CROSSINGS IN CONSTANT RANGE | | |
| (C) | INTERCHANGE / RAMP | | |
| (D) | JUNCTION | | |
| (E) | INTEGRATE CROSSINGS OF THE SAME CROSSING NAME | | |
| (F) | CROSSING OF SPECIFIC CONTROL UNEXPRESSIBLE IN ORIGINAL DATA | | |

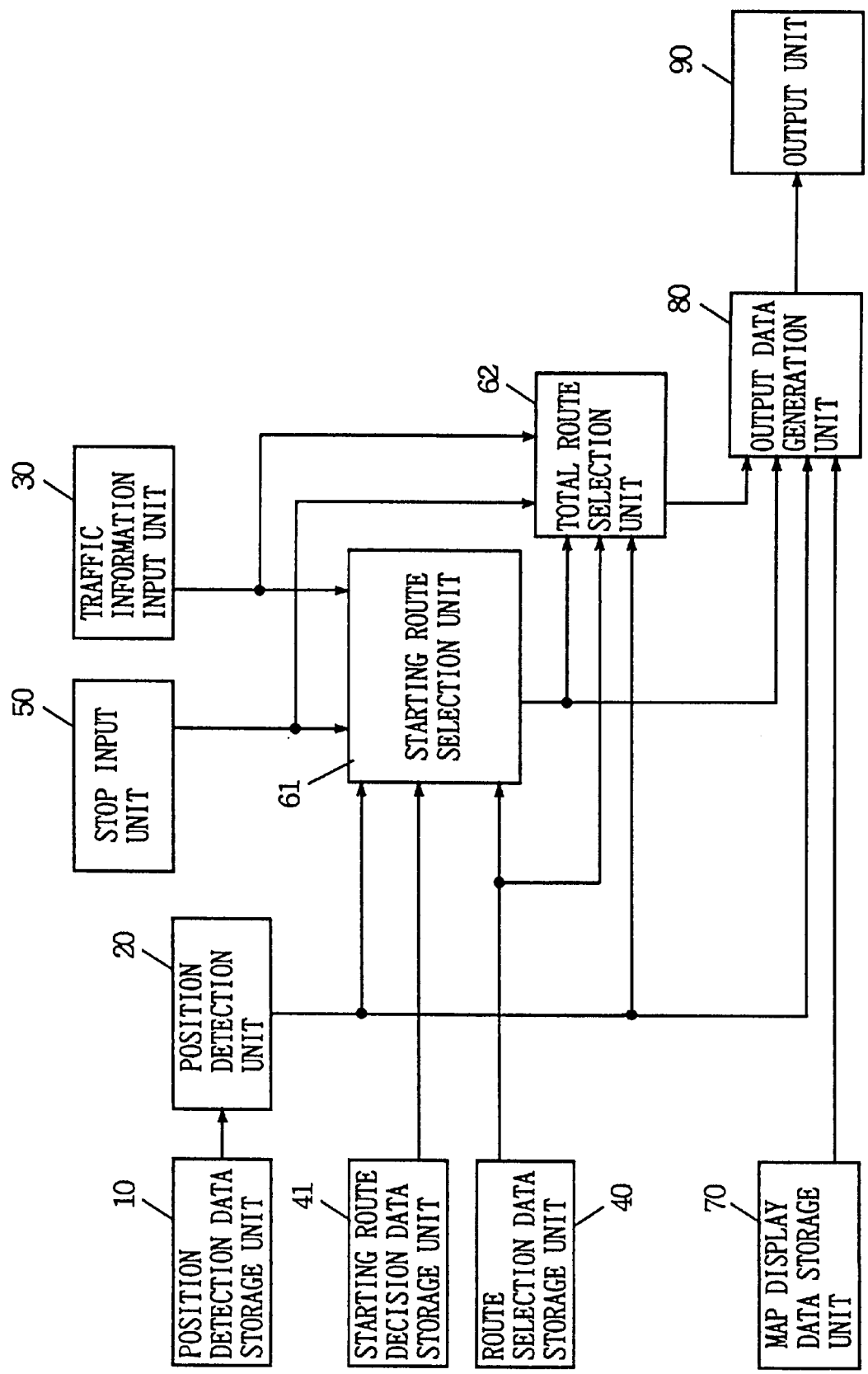

ACTUAL ROAD SYSTEM

HOUSING SITE / ROAD
CROSSING

ROUTE SELECTION DATA

CROSSING (NODE)

ROAD (LINK)

MAP DIVISION BOUNDARY (UNIT BOUNDARY)

NODE NECESSARY IN DIVISION (BOUNDARY NODE)

ROAD SYSTEM AND NODE POSITIONS

STARTING ROUTE DECISION DATA

| STARTING PLACE | DESTINATION | COST |
|---|---|---|
| 1 | ⋮ | ⋮ |
|   | 131 | 29 |
|   | 132 | 27 |
|   | ⋮ | ⋮ |
| 2 | ⋮ | ⋮ |
|   | 131 | 32 |
|   | 132 | 30 |
|   | ⋮ | ⋮ |
| 3 | ⋮ | ⋮ |
|   | 131 | 25 |
|   | 132 | 27 |
|   | ⋮ | ⋮ |
| 4 | ⋮ | ⋮ |
|   | 131 | 27 |
|   | 132 | 25 |
|   | ⋮ | ⋮ |

SEARCH OF CONSTANT RANGE

OPTIMUM ROUTES TO RESPECTIVE NODES

DECISION OF STARTING ROUTE

STARTING PLACE   STARTING ROUTE DECISION DATA   DESTINATION

DISPLAY OF STARTING ROUTE

START TOTAL ROUTE SELECTION

SELECT ROUTE TO DESTINATION

SEARCH CONSTANT RANGE FROM CURRENT POSITION

SELECT ROUTE FROM CURRENT POSITION TO DESTINATION

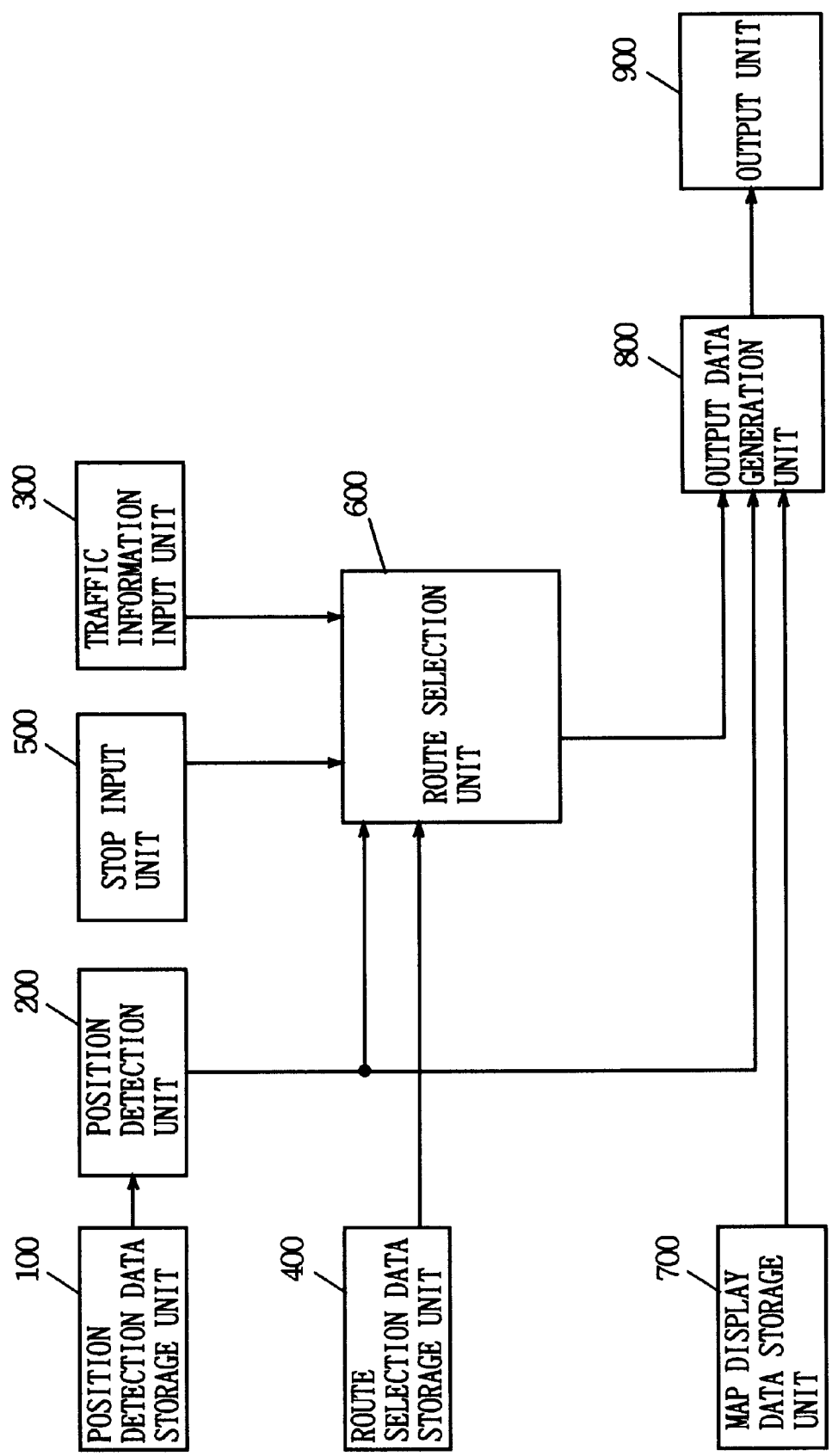

FIG. 24A
ACTUAL ROAD SYSTEM
FIG. 24B
ROUTE SELECTION DATA
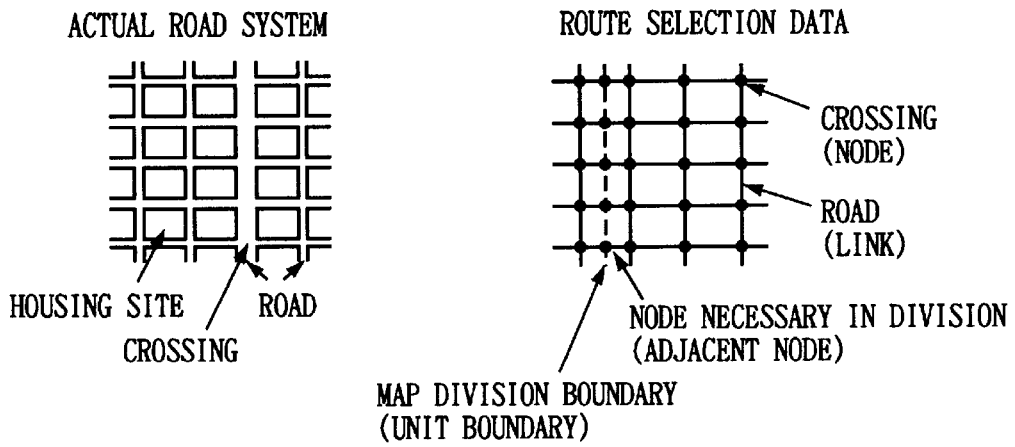
FIG. 25A
ROAD SYSTEM
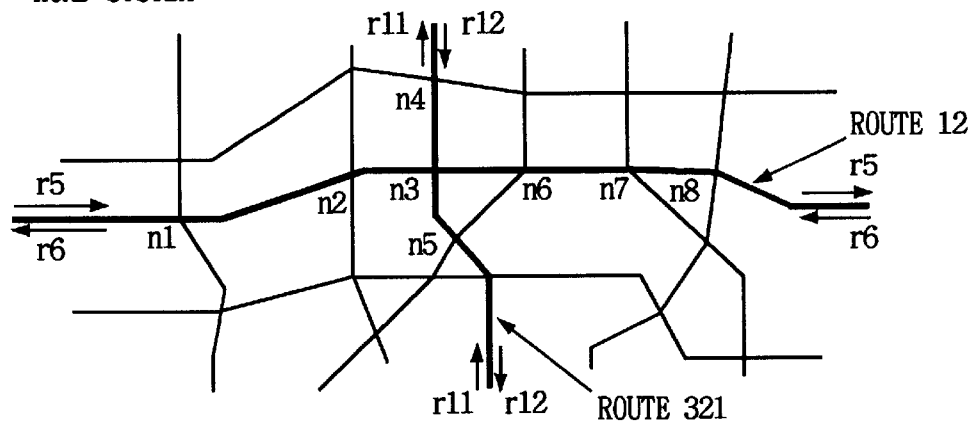
FIG. 25B
ROUTE SELECTION DATA
| LINK No. | NODE a | NODE b | ROUTE No. | | NAME | .... |
| | | | a→b | b→a | | |
|---|---|---|---|---|---|---|
| 1 | n1 | n2 | r5 | r6 | ROUTE 12 | |
| 2 | n2 | n3 | r5 | r6 | ROUTE 12 | |
| 3 | n3 | n6 | r5 | r6 | ROUTE 12 | |
| 4 | n6 | n7 | r5 | r6 | ROUTE 12 | |
| 5 | n7 | n8 | r5 | r6 | ROUTE 12 | |
| ⋮ | ⋮ | ⋮ | ⋮ | ⋮ | | |
| 21 | n3 | n4 | r11 | r12 | ROUTE 321 | |
| 22 | n3 | n5 | r12 | r11 | ROUTE 321 | |
| ⋮ | | | | | | |

SEARCH IN THE VICINITY OF
CURRENT POSITION

ROUTE SELECTION DISPLAY

ROUTE SELECTION SYSTEM AND METHOD UTILIZING INTEGRATED CROSSINGS, A STARTING ROUTE, AND/OR ROUTE NUMBERS

BACKGROUND OF THE INVENTION

1. Field of the Invention

The present invention relates to a route selection system, and more specifically, it relates to a system for automatically selecting the optimum route between a starting place and a destination which are designated on a map.

2. Background of the Invention

Navigation systems for guiding cars are rapidly coming into wide use following the development of electronic techniques. Some conventional navigation systems comprise a route selection system for automatically selecting the optimum route from a starting place to a destination, such as the shortest route or the minimum time route, for example.

In relation to the conventional route selection system, Japanese Patent Laying-Open No. 59-105113 (1984), for example, discloses an automatic car navigation method as a method of obtaining the optimum route for guiding a car. This method is adapted to obtain the optimum route between a starting place and a destination from data expressing a network of roads by a Dijkstra method, which is one of optimum route deciding methods, or the like. The theory of the Dijkstra method is described in "Data Structure and Algorithm" written by Alfred V. Aho and translated by Yoshio Ono, Kabushiki Kaisha Baifu-Kan, published in 1990, pp. 179 to 183, for example.

On the other hand, Japanese Patent Laying-Open No. 2-56591 (1990), for example, discloses a route search method which executes a search through map data having a hierarchical structure for obtaining the optimum route, in order to reduce the calculation time.

In the aforementioned search for the optimum route between two arbitrary spots on the network, however, the routing time is disadvantageously increased as the number of crossings and roads included in the network are increased. Consequently, the user's waiting time is increased to 2 to 3 minutes, leading to inconvenience. Further, generally provided road system data are so detailed and enormous in quantity (several gigabytes) that it is difficult to obtain the route directly from such data on an on-vehicle unit.

While it may be possible to select the route through thinned rough road system data such as those excluding general roads other than national roads and highways as described in Japanese Patent Laying-Open No. 2-56591 (1990), for example, detailedness of the obtained route is reduced as compared with the case of employing detailed road system data, leading to such inconvenience that roads to be passed cannot be clearly recognized except the national roads and highways, for example.

In the conventional method, further, the obtained optimum route cannot be changed even if the same includes a road to be avoided for the user's own reasons.

SUMMARY OF THE INVENTION

Accordingly, an object of the present invention is to provide a method and a system of route selection which can remarkably reduce the time for searching for the optimum route to the destination.

Another object of the present invention is to provide a method and a system of route selection which can reduce the time for searching for the optimum route to the destination without deteriorating detailedness of the selected route.

Still another object of the present invention is to provide a route selection system which enables the user to start his car without waiting for completion of the search for the optimum route to the destination.

A further object of the present invention is to provide a method and a system of route selection which can select a route suiting the user's taste.

According to a first aspect of the present invention, crossings satisfying predetermined conditions are integrated with each other in original data describing a detailed road system, thereby creating route selection data reducing the number of crossings. The route selection data are employed to search for the optimum route between a starting place and a destination as designated. Consequently, the number of crossings provided on the map is reduced while that of the crossings for a route search is also reduced, whereby the routing time is remarkably reduced.

When the route selection data integrating the crossings as described above are directly applied to a route search, the route may disadvantageously be unclearly guided. According to a preferred embodiment, therefore, links which are deleted due to the integration of the crossings, but are to be passed in practice, are recorded in a passage link table with reference to approach and escape links, so that the deleted links are read from the passage link table and supplemented when the optimum route obtained by the search passes through integrated crossings. Thus, it is possible to display and guide the route through the integrated crossings in detail.

When the traffic is controlled over a plurality of crossings on the actual road system, these crossings may be integrated with each other on the original data so that the traffic control over the integrated crossings is recorded in the passage link table. Thus, it is possible to record traffic controls which have been impossible to express on the original data in general, so that a route further suitable for the actual situation can be selected in accordance with the information.

Further, evaluation values in passage through the integrated crossings may be recorded in the passage link table with reference to the approach and escape links, so that the passage evaluation values corresponding to approach and escape directions are read from the passage link table and referred to when the integrated crossings are employed for the route search. Thus, the passage evaluation values in the integrated crossings can be correctly reflected on the route search.

In addition, traffic information provision numbers as to the integrated crossings may be recorded in the passage link table with reference to the approach and escape links, to search for the optimum route in consideration of traffic information which is proposed in correspondence to the traffic information provision numbers. Thus, it is possible to search for the optimum route reflecting the traffic information.

When the road system data provided in the route selection data include crossings which are integrated with each other beyond the boundary of a predetermined region, i.e., the range providing the traffic information, traffic information provision numbers corresponding to regions to which the crossings have belonged before the integration may also be recorded in the passage link table in addition to those corresponding to the region to which the crossings belong after the integration. Thus, traffic information can be correctly reflected on selection of the optimum route even if the crossings are integrated beyond the range providing the traffic information. In other words, a plurality of crossings can be integrated with each other regardless of the unit of provision of the traffic information.

When a plurality of roads are present between two crossings which are adjacent to each other due to the integration of the crossings, these roads are preferably integrated with each other. Thus, the number of roads on the map is reduced to cut down the roads for the route search, whereby the routing time can be further reduced.

According to a second aspect of the present invention, optimum routes from a starting place to respective spots which are present in a prescribed range are first searched for, and any one of the optimum routes is selected as a starting route. The starting route is outputted for guidance, and thereafter the optimum route to the destination is searched for. Thus, according to the second aspect, the temporary route for starting the car from the starting place is obtained and outputted before the route from the starting place to the destination is obtained, whereby the driver can start his car without waiting for completion of the search for the route between the starting place and the destination.

The range of the search for the starting route is restricted to the vicinity of the starting place. For example, optimum routes to respective spots which are present in a range reachable in a constant time or at constant distances from the starting place are searched for so that any one of these routes is selected as the starting route.

Various methods can be employed for selecting the starting route from the plurality of optimum routes as searched for.

The first method is adapted to presume arrival evaluation values from the terminal spots of the respective optimum routes obtained by the search to the destination, for selecting the optimum route having the minimum arrival evaluation value as the starting route. Thus, a route having small traveling loss can be selected as the starting route.

In the aforementioned first method, a memory storing starting route decision data may be so provided that the arrival evaluation values from the terminal spots of the optimum routes to the destination which are necessary for selecting the starting route are presumed on the basis of the starting route decision data stored in the memory. The starting route decision data include arrival evaluation values which are necessary for traveling along the optimum route between two arbitrary spots as to each of a plurality of spots previously picked up on the map. Thus, a road providing the optimum route to the destination can be selected as the starting route regardless of the direction of the destination and the type of the road system.

When the map employed for the route search is previously divided into units, the starting route decision data may include spots on roads which are present on the boundaries between the units, as the spots on the starting side for storage of the arrival evaluation values. In this case, the optimum routes to the respective spots which are present in the units including the starting place are searched for so that any one of the optimum routes is selected as the starting route. Thus, the number of the spots for storage of the arrival evaluation values can be limited, so that the quantity of the data to be stored is reduced.

The aforementioned memory may store the arrival evaluation values while reducing the number of spots on the destination side as compared with that of the spots on the starting place side. Thus, the number of combinations of arbitrary pairs of spots can be further reduced, thereby further reducing the quantity of data to be stored.

In the second method, on the other hand, arrival evaluation values which are necessary for traveling along one-line distances between the terminal spots of the respective optimum routes obtained by the search and the destination are obtained so that the optimum route having the minimum arrival evaluation value is selected as the starting route.

In the third method, further, a memory is so provided as to store starting route decision data including the optimum route between two arbitrary spots and information related to spots to be passed for traveling along the optimum route as to each of a plurality of spots which are previously picked up on the map. The optimum route between the starting place and the destination is acquired from the starting route decision data, so that the route most approaching the direction of the passage spots included on the optimum route which is acquired from the starting route decision data is selected as the starting route from the plurality of optimum routes obtained by the search.

In the fourth method, further, the route most approaching the direction of the destination is selected as the starting route from the plurality of optimum routes obtained by the search.

After the search for the starting route, the optimum route to the destination is searched for in the following manner, for example: First, a first optimum route from the starting place to the destination is searched for. Then, a second optimum route for reaching the first optimum route from the current position is searched for. The first and second routes are connected with each other, to obtain the optimum route from the current position to the destination. Thus, the optimum route from the current position to the destination can be regularly obtained even if the car moves while the first optimum route is obtained.

In the search for the second route, a prescribed range about the current position may be so searched that the second route is set between the current position and a spot intersecting with the first route on the boundary of the search range. Thus, no abnormal route such as a U-turn is caused on a joint.

In the search for the optimum route to the destination, the optimum route between the terminal spot of the previously obtained starting route and the destination may be searched for. Thus, the route to the destination can be presented with no interruption of the navigation.

The data necessary for searching for the starting route may be prepared during the user's operation for setting the destination of the route. Thus, the user's waiting time can be reduced.

According to a third aspect of the present invention, route selection data recording a road system and route numbers which are arbitrarily set on prescribed roads are employed to obtain the route from the starting place or its vicinity to the destination or its vicinity on the basis of the route numbers included in the route selection data. Thus, the range of the search for the optimum route is reduced as compared with the prior art, whereby the routing time is remarkably reduced.

In the aforementioned third aspect, the route numbers of roads passing through the vicinity of the starting place and that of the destination respectively may be compared with each other so that roads having the same route number are selected as the route connecting the vicinity of the starting place with that of the destination. Namely, the vicinity of the starting place may be connected with that of the destination by the roads having the same route number. In this case, the optimum route is preferably searched for between the starting place and the road of the selected route number. Thus, smooth driving can be implemented in the vicinity of the starting place. More preferably, the optimum route is searched for between the road of the selected route number and the destination. Thus, smooth driving can be implemented in the vicinity of the destination.

Alternatively, the route selection may be so carried out that the optimum route is searched for in the vicinity of the starting place and thereafter the search range and the vicinity of the destination is connected with each other by roads having the same route number. In this case, the optimum route is preferably searched for also between the roads of the selected route number and the destination.

Further, the route selection may be so carried out that the optimum route is searched for in both of the vicinity of the starting place and that of the destination, and the search ranges are connected with each other by roads having the same route number.

When a plurality of roads having the same route number are found as the result of the comparison, the user may select any one of the roads. Thus, the route can be selected in response to the user's taste.

The user may designate a spot to be passed through and obtain its route number, so that the optimum route between the starting place and a road having the obtained route number is obtained in the vicinity of the starting place while the optimum route between the road having the obtained route number and the destination is obtained in the vicinity of the destination.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3(A) and 3(B) are adapted to illustrate an exemplary mode of expressing a road system in original data;

FIGS. 4(A) to 4(C) illustrate the types of roads expressed as different roads in the original data;

FIGS. 6(A) to 6(C) illustrate an exemplary operation of integrating roads included in the original data;

FIGS. 7(A) to 7(C) are adapted to illustrate relations between a passage link table included in route selection data employed in the embodiment shown in FIG. 1 and a road system on the original data;

FIGS. 8(A) to 8(D) are adapted to illustrate relations between the road system on the original data and passage links integrated over adjacent regions;

FIG. 13 illustrates roads which are preferably integrated with each other in the present invention;

FIG. 14 is a block diagram showing a route selection system according to a second embodiment of the present invention;

FIG. 23 is a block diagram showing a route selection system according to a third embodiment of the present invention;

FIGS. 24(A) and 24(B) are adapted to illustrate an exemplary mode of expressing a road system in route selection data;

FIGS. 25(A) and 25(B) are adapted to illustrate an exemplary mode of expressing the road system in original data;

DESCRIPTION OF THE PREFERRED EMBODIMENTS (First Embodiment)

Figure 1:
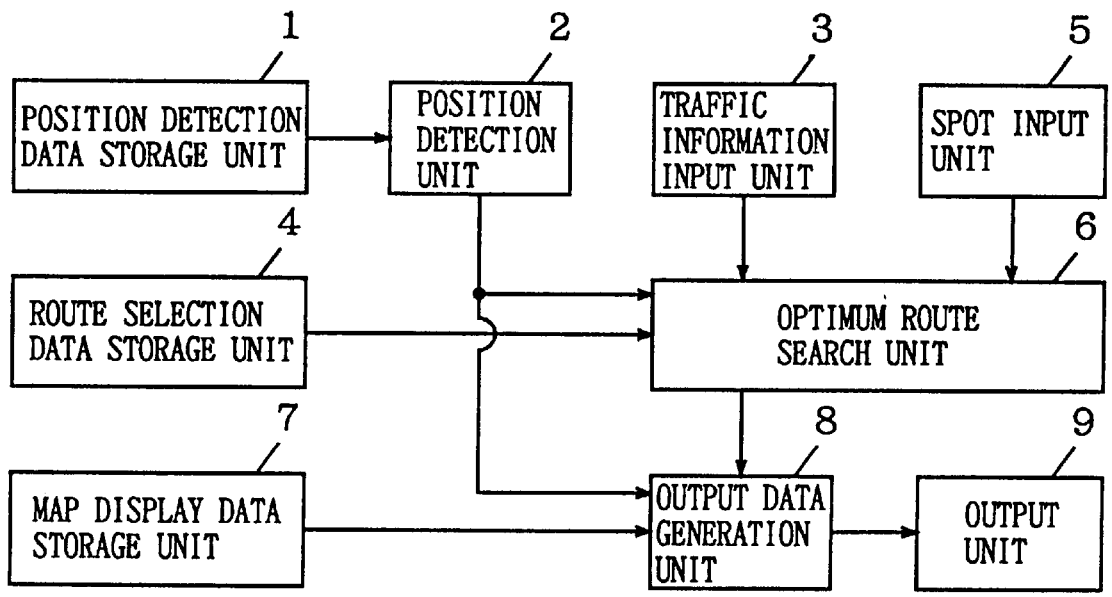
FIG. 1 is a block diagram showing a route selection system according to a first embodiment of the present invention.

FIG. 1 is a block diagram showing a route selection system according to a first embodiment of the present invention. Referring to FIG. 1, the route selection system according to this embodiment comprises a position detection data storage unit 1, a position detection unit 2, a traffic information input unit 3, a route selection data storage unit 4, a spot input unit 5, an optimum route search unit 6, a map display data storage unit 7, and an output data generation unit 8, and an output unit 9.

The position detection data storage unit 1 includes a recording medium such as a CD-ROM, and stores position detection data describing a detailed road system which is employed for detecting the current position of a car. The position detection unit 2 obtains the general position and locus of the car through the speed of the car, the angle of its turn and an electric wave (GPS) from a satellite, and refers to the position detection data stored in the position detection data storage unit 1 to correctly obtain the current position of the car. The traffic information input unit 3 includes a receiver, a modem etc. and receives traffic information which is transmitted through the electric wave or a telephone line to input the same in the optimum route search unit 6. The route selection data storage unit 4 includes a recording medium such as a CD-ROM, and stores route selection data employed for selecting the optimum route. The route selection data include data of the road system, and data indicating correspondence between the traffic information inputted from the traffic information input unit 3 and the roads. The spot input unit 5 operates in response to the user's operation, to input the destination of the route in the optimum route search unit 6 (and the starting place if necessary).

The optimum route search unit 6 obtains the optimum route from the starting place to the destination through the route selection data stored in the route selection data storage unit 4 and the traffic information inputted from the traffic information input unit 3. The current position of the car which is detected by the position detection unit 2, or starting place information which is inputted from the spot input unit 5 is employed as the starting place. On the other hand, destination information which is inputted from the spot input unit 5 is employed as the destination.

The map display data storage unit 7 includes a recording medium such as a CD-ROM, and stores map display data including shapes of roads, lands, harbors, rivers and parks on the map. The output data generation unit 8 refers to the map display data stored in the map display data storage unit 7, thereby generating image data for displaying the current position of the car obtained in the position detection unit 2 and the map of its vicinity, or the map of a range desired by the user. If the route obtained by the optimum route search unit 6 is included in the displayed range, the output data generation unit 8 also generates image data thereof. Further, the output data generation unit 8 outputs guidance information for guiding the car, such as voice information and/or display information "turn to the right at the crossing 100 m ahead", for example, on the basis of the current position of the car and the selected optimum route. The output unit 9 includes a display and a speaker, for displaying and voice-outputting the image data and the voice information supplied from the output data generation unit 8.

Figure 2:
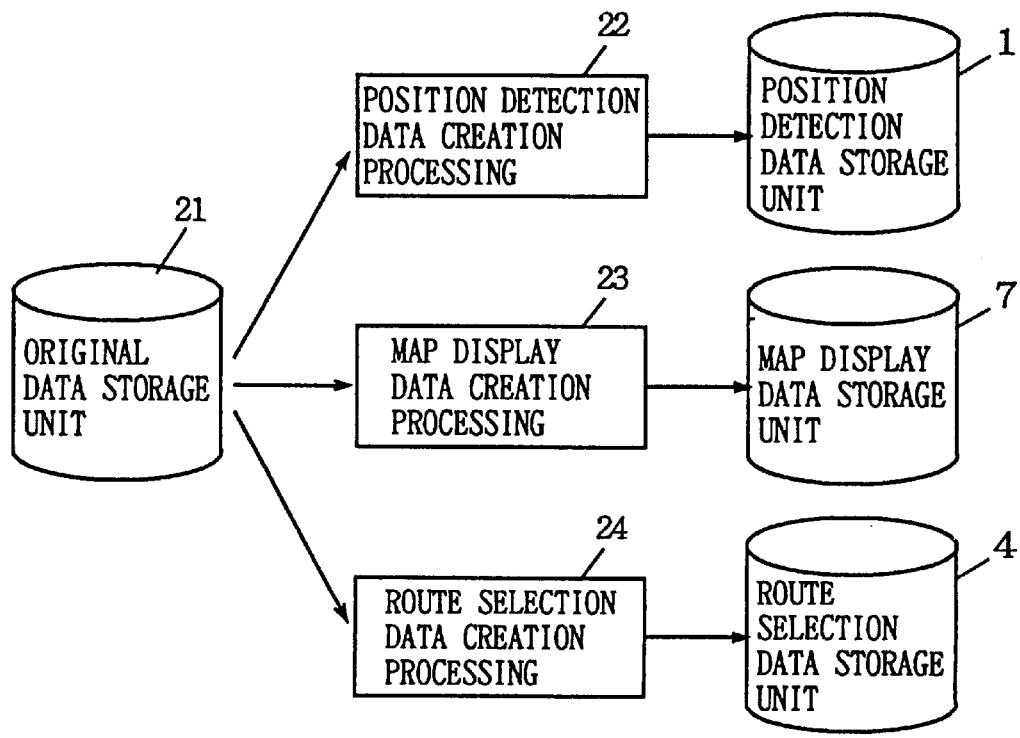
FIG. 2 is adapted to illustrate methods of creating position detection data, route selection data and map display data employed in the route selection system shown in FIG. 1.

Description is now made on methods of creating the position detection data, the route selection data and the map display data which are stored in the position detection data storage unit 1, the route selection data storage unit 4 and the map display data storage unit 7 shown in FIG. 1 respectively. FIG. 2 is an explanatory diagram on creation of these data.

Referring to FIG. 2, an original data storage unit 21 stores original data for creating the position detection data, the route selection data and the map display data. The original data are prepared from map data provided by Japan Digital Road Map Association (DRMA), for example. The map data provided by DRMA include a road system, geographical features, shapes of facilities and correspondence between roads and traffic information. In the road system on the map data provided by DRMA, actual roads (refer to FIG. 3(A), for example) are vectorized into single lines (refer to FIG. 3(B)) about center lines respectively to be thus recorded, in order to reduce the data quantity. Roads which are independent of each other due to directions of movement such as interchanges, roads such as highways, toll roads or sideways thereof whose up and down lines are slightly separated from each other, and overhead crossings shown in FIG. 4B, for example, are recorded as different roads. The positions and shapes of the roads are recorded in detail, to be used for position detection and map display. As to roads, such as those of a road system shown in FIG. 5(A), for example, whose traffic information is provided, data associating these roads with traffic information provision numbers corresponding thereto are recorded.

The position detection data stored in the position detection data storage unit 1 are created by processing the data related to the road system included in the original data which are stored in the original data storage unit 21 by position detection data creation processing 22. Namely, the position detection data creation processing 22 refers to connections between and shapes of the roads, coordinates of crossings and the like, to create the position detection data. At this time, the positions and shapes of the roads are recorded in detail with no omission, to be used by the position detection unit 2 for collating the traveling locus of the car and the position coordinates. Thus, the current position of the car can be further correctly calculated.

The map display data stored in the map display data storage unit 7 are created by processing the geographical features, the shapes of the facilities and the roads, the names of places etc. included in the original data which are stored in the original data storage unit 21 through map display data creation processing 23.

The route selection data stored in the route selection data storage unit 4 include road system data employed for selecting the route, and data indicating correspondence between the roads and the traffic information. The route selection data are created by processing the original data which are stored in the original data storage unit 21 by route selection data creation processing. The method of creating the road system data in the route selection data is now described, followed by description of the method of creating the data indicating the correspondence between the roads and the traffic information.

The method of creating the road system data included in the route selection data is first described in detail. The road system data, which are used for selecting the route from the starting place to the destination in the optimum route search unit 6, are created by referring to connections between the roads and the positions of the crossings from the data related to the road system included in the original data which are stored in the original data storage unit 21. In the original data, however, the positions of the roads and the crossings must be correct in order to create the aforementioned position detection data which are stored in the position detection data storage unit 1 etc., while the roads are vectorized in order to reduce the data quantity, as described above. Therefore, information which may be simply expressed as a single crossing for selection of the route is formed by a plurality of crossings, as shown in FIG. 4. When the road system of the detailed original data is recorded as the route selection data in this state, a long search time is required and the quantity of the recorded data is increased due to large numbers of the crossings and the roads. In the route selection data creation processing 24, therefore, processing for reducing the number of the crossings (nodes) and the roads (links) from the road system of the original data is carried out. In other words, the route selection data creation processing 24 converts nodes or links, which are recorded as a plurality of nodes or links on the original data but generally decided as a single node or link by the human, to a single node or link and thereafter records the same as the route selection data. This conversion method is now described in detail.

First, a plurality of approximate nodes are integrated with each other by first conversion processing. In this processing, nodes which are connected with each other by links and approximate to each other as shown in FIG. 6(A) are integrated with each other as shown in FIG. 6(B), among those recorded in the original data.

Then, links connecting pairs of nodes with each other are integrated with each other by second conversion processing. When a plurality of links connect pairs of nodes which are integrated with each other as shown in FIG. 6(B), those corresponding to up and down lines of the roads are integrated with each other as shown in FIG. 6(C).

Then, a passage link table is created by third conversion processing, to be capable of deciding links which are omitted by the integration of the crossings through the relations between approach links and escape links for the nodes. It is assumed that the original data include crossings shown in FIG. 7(A), which are integrated with each other as shown in FIG. 7(B). In this case, links to be passed in the integrated nodes are specified and recorded from the relations between the links approaching the integrated nodes and escaping from the same after passage through the nodes, as shown in FIG. 7(C). It is understood from the passage link table that, when the car approaches a crossing from a link A and escapes to a link F, the links passed in the integrated nodes are a and b, and the links are passed in order of A=a=b→F.

Then, costs in employment of the passage links, such as the time for passing the same in the case of obtaining a route for reaching the destination in the minimum time or the distances of the passed links in the case of obtaining a route for reaching the destination at the minimum distance, for example, are recorded in the passage link table in fourth conversion processing. When passage links are recorded from the relations of the links for approaching/escaping to/from the integrated nodes in the passage link table shown in FIG. 7(C), for example, the costs required for passing the respective passage links are calculated to obtain the total sum of the times required for passing the links. Further, costs required for the passage links are also recorded in the passage link table similarly to the passage links, in correspondence to combinations of the approach/escape links. Thus, it is possible to derive the times required for passing the links which are omitted due to the integration from the relations between the approach and escape links in the integrated links in selection of the optimum route.

As hereinabove described, the route selection data also include the data indicating the correspondence between the traffic information and the roads, in addition to the road system data created by the first to fourth conversion processing. The method of creating the data is now described.

Figures 5A, 5B, 5C:
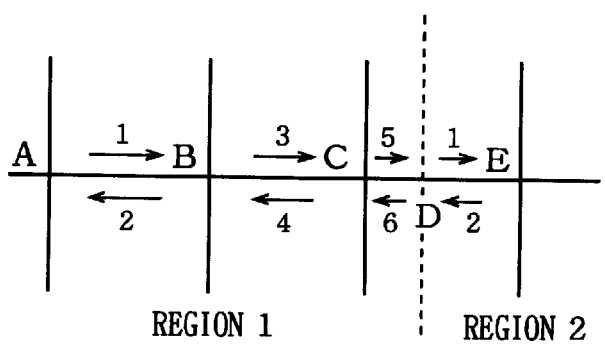
FIGS. 5(A) to 5(C) are adapted to illustrate relations between traffic information provision modes and traffic information provision number recording modes in the original data.
Figure 9:
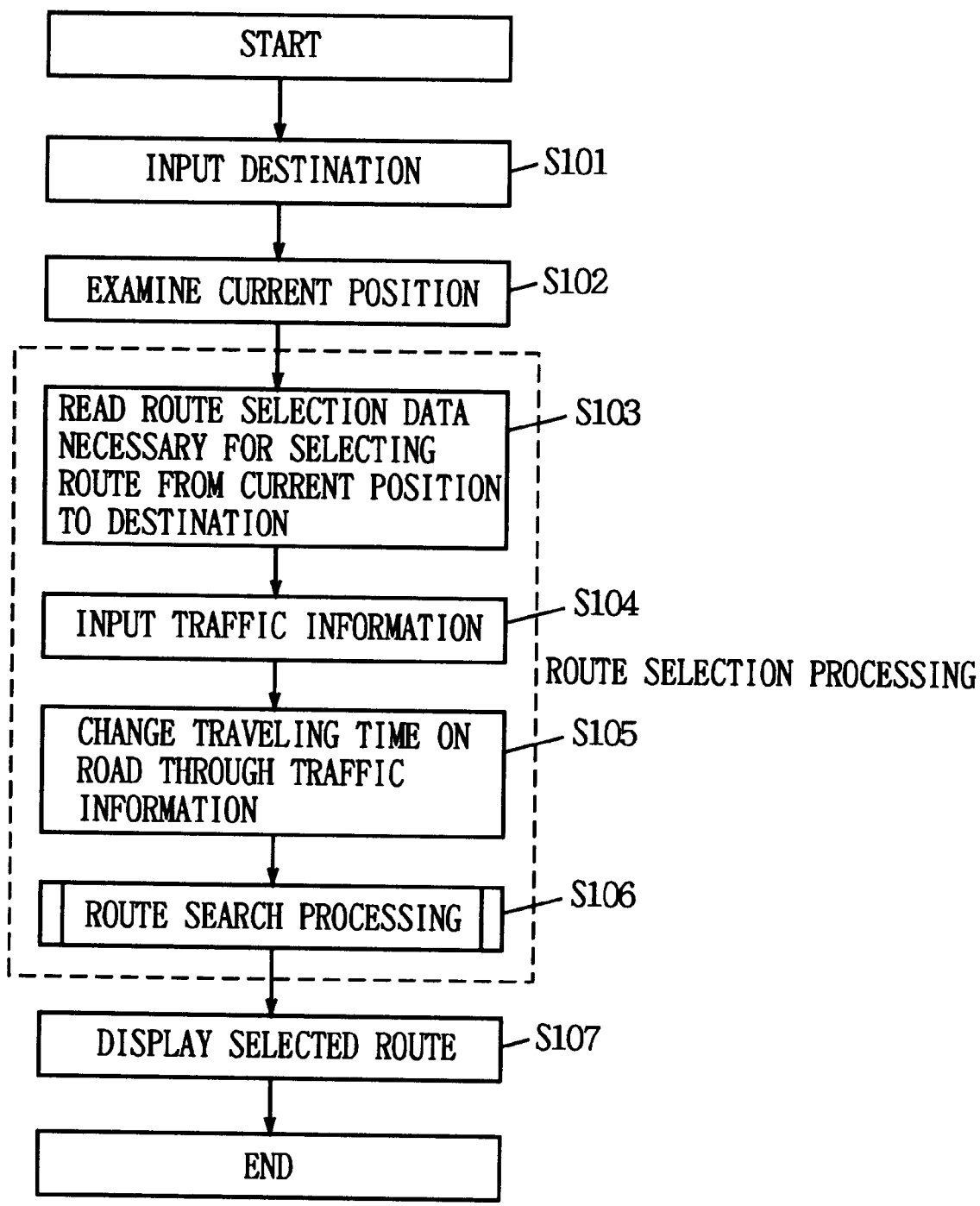
FIG. 9 is a flow chart for illustrating the operation of the route selection system shown in FIG. 1.

As to the correspondence between the traffic information and the links, corresponding traffic information provision numbers are recorded in the aforementioned original data (refer to FIG. 5(B)) with respect to the respective relations between start nodes and end nodes of the links in the road system shown in FIG. 5(A), for example. The traffic information provides information such as the degrees of congestion, traveling times and traffic controls as to the roads provided with the provision numbers as shown in FIG. 5(C), for example. Also with respect to the links of the road system data which are included in the route selection data, correspondence to the traffic information provision numbers is created with reference to the correspondence data in the original data (refer to FIG. 5(B)).

The original data and the traffic information are divided in accordance with constant conditions such as secondary mesh units (units of long. 7'30" and lat. 5'), for example, and recorded and provided every range of a constant region. However, the road system data which are included in the route selection data may go beyond the boundary of the constant region.

When a plurality of nodes and a plurality of links are integrated with each other without going over the boundary between regions included in the original data in a road system shown in FIG. 8(A), for example, the route selection data are as shown in FIG. 8(B). When a plurality of nodes and a plurality of links are integrated with each other over the boundary between the regions included in the original data in the road system shown in FIG. 8(A), however, the road system is as shown in FIG. 8(C) after the integration. Therefore, the traffic information provision numbers related to the links which are omitted by such integration are recorded to include those of the region adjacent to the original region, so that the route selection data are as shown in FIG. 8(D). Thus, it is possible to select the shortest route while reliably using the traffic information, also when the region recording the nodes and the links is shifted to the adjacent one due to the integration.

FIGS. 9 to 12 are flow charts showing the operation of the route selection system shown in FIG. 1. The route selecting operation in the route selection system shown in FIG. 1 is now described with reference to FIGS. 9 to 12. The following description is made on a method of selecting a route for reaching a destination which is inputted by the user in the shortest traveling time from the current position of the car, for example.

First, the optimum route search unit 6 inputs the position coordinates (the latitude and the longitude) of the destination from the spot input unit 5, in response to the user's operation (step S101). Then, the optimum route search unit 6 inputs the coordinates (the latitude and the longitude) of the current position of the car and the traveling direction thereof from the position detection unit 2 (step S102). Then, the optimum route search unit 6 executes processing of selecting the route from the current position of the car to the destination (steps S103 to S106).

In the aforementioned route selection processing, the optimum route search unit 6 reads road system data and data corresponding to traffic information for every route present in a range (a rectangular range including the starting place and the destination is assumed in general) which may be passed by the shortest route from the starting place to the destination from the route selection data storage unit 4, and stores the same in an internal memory (not shown) (step S103). Then, the optimum route search unit 6 inputs traffic information provision numbers and traffic information data corresponding thereto from the traffic information input unit 3 every constant range (step S104). Then, the optimum route search unit 6 calculates traveling times which are necessary for passing through the respective links of the road system data on the basis of the traffic information data inputted from the traffic information input unit 3 and the data corresponding to the traffic information read from the route selection data storage unit 4, associates the calculated traveling times with the respective links and stores the same in the internal memory (step S105).

Through the road system data reflecting the traffic information stored in the internal memory in the aforementioned manner, the optimum route search unit 6 examines the link on which the car is currently traveling from the coordinates of the current position and the traveling direction, and searches for a route attaining the shortest traveling time to a link in the vicinity of the coordinates of the destination from this link (step S106). The route search processing at the step S106 is executed by a well-known shortest route search method such as the Dijkstra method, as shown in FIG. 10 in detail.

Figure 10:
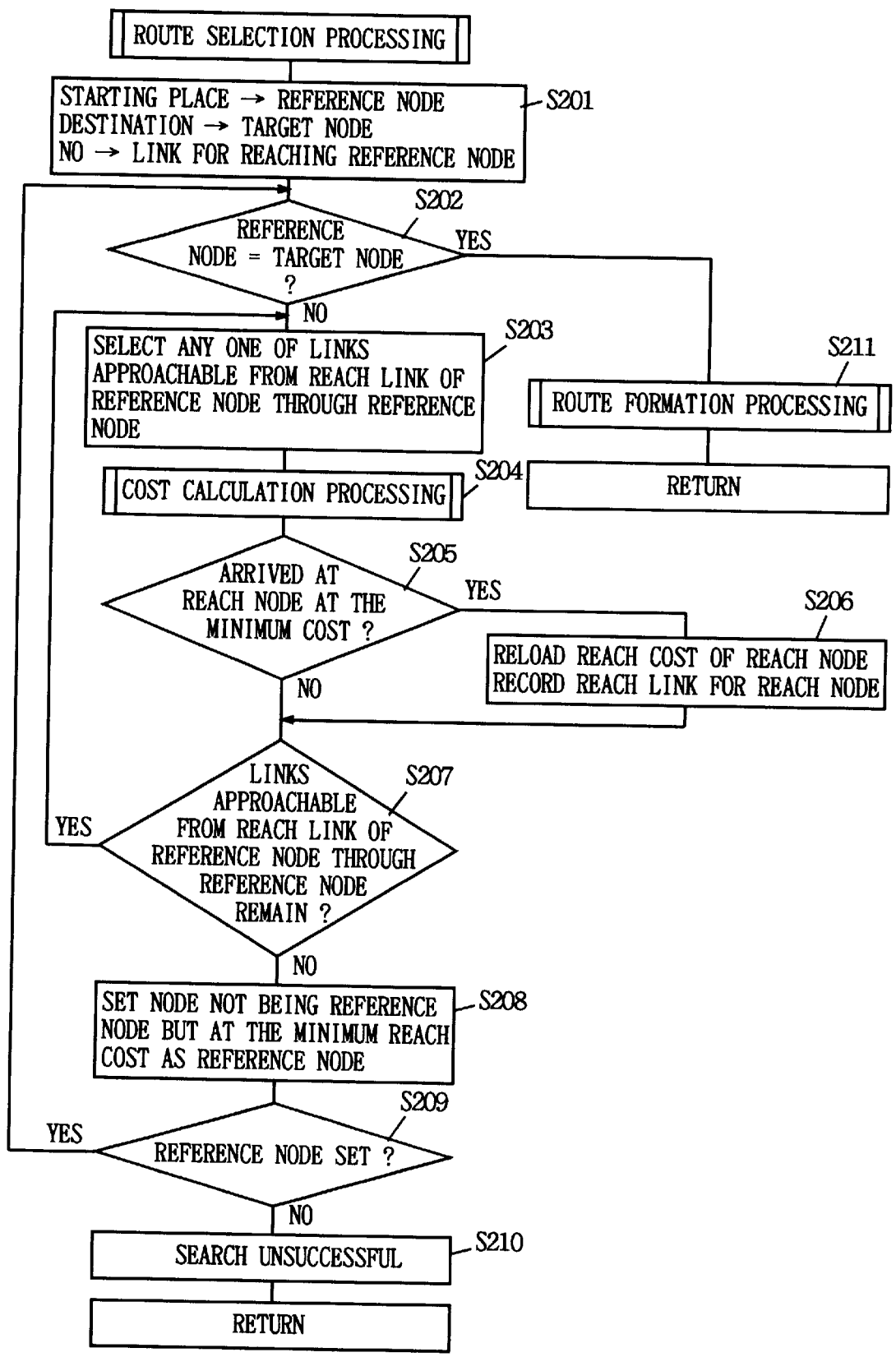
FIG. 10 is a flow chart showing the operation at a subroutine step S106 appearing in FIG. 9 in detail.

Referring to FIG. 10, the optimum route search unit 6 first carries out initialization (step S201). Namely, the optimum route search unit 6 sets the starting place and the destination as a reference node and a target node respectively, while setting no provision of a link for reaching the reference node. Then, the optimum route search unit 6 determines whether or not the reference node is the target node (step S202). At first, the reference node cannot be the target node since the starting place is the reference node. Therefore, the optimum route search unit 6 examines links which can be approached from the starting place, and selects any one of these links (step S203). Then, the optimum route search unit 6 calculates the cost for reaching a node (hereinafter referred to as a reach node) which is positioned on the forward end of the link selected at the step S203 (step S204). Then, the optimum route search unit 6 determines whether or not the calculated reach cost is the minimum cost among those theretofore calculated with respect to the reach node (step S205). At first, the reach cost for each reach node is calculated for the first time, and the determination at the step S205 is of YES, as a matter of course. Therefore, the optimum route search unit 6 records the calculated reach cost to the reach node and the link (reach link) from the starting place to the reach node in the internal memory (step S206).

Then, the optimum route search unit 6 determines whether or not unselected links remain among those approachable from the starting place (step 207). If unselected links remain, the optimum route search unit 6 returns to the operation at the step S203 again. In other words, the optimum route search unit 6 selects any one from the remaining links, to execute calculation of the reach cost and recording processing (steps S203 to S207).

The aforementioned processing at the steps S203 to S207 is repeated, and when calculation of the reach costs for the respective reach nodes is complete as to all links approachable from the starting place, the optimum route search unit 6 sets a node having the minimum reach cost as a next reference node among those which are not reference nodes but reach costs thereof have already been calculated (step S208). At first, reach nodes which are positioned on the forward ends of the respective links approachable from the starting place are noted and hence the node having the minimum reach cost is set as the next reference node among these reach nodes. Then, the optimum route search unit 6 determines whether or not the reference node is set at the step S208 (step S209). If no reference node is set for some reason, the optimum route search unit 6 determines that the search for the route has been unsuccessful (step S210) and returns to the main routine shown in FIG. 9. Thereafter the optimum route search unit 6 displays the failure of the search for the route on the output unit 9 through the output data generation unit 8 (step S107), and completes the operation.

When the reference node is set, on the other hand, the optimum route search unit 6 returns to the operation at the step S202, and executes the processing of the steps S203 to S209 for the newly set reference node. The operation is now described in further detail with respect to such case that an arbitrary node positioned between the starting place and the destination is set as the reference node.

Figure 11:
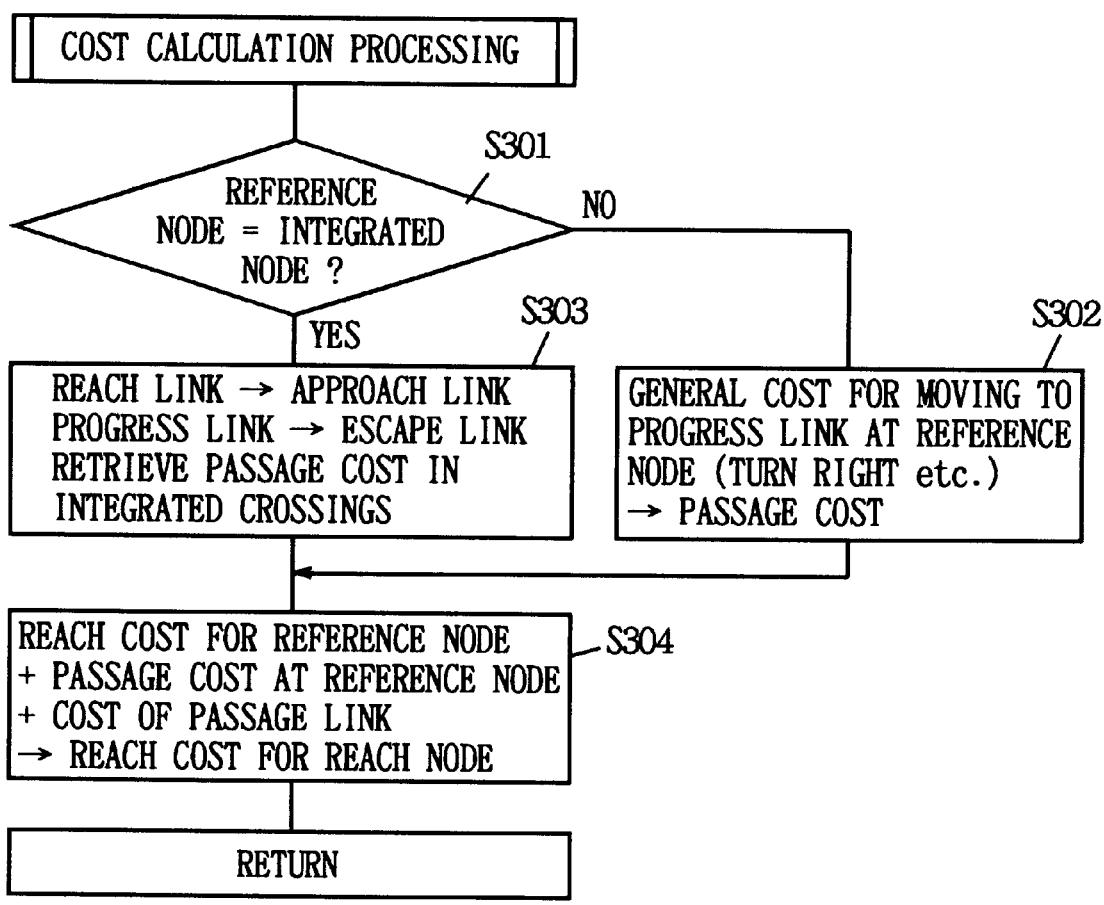
FIG. 11 is a flow chart showing the operation at a subroutine step S204 appearing in FIG. 9 in detail.

First, the current reference node is determined as being not the target node (step S202), and links which are approachable from the reach link of the reference node through the reference node are examined so that any one thereof is selected (step S203). Each node which is present on the map is set as the reference node when the shortest route from the starting place to this node is decided. The reach link of the reference node means a link which is positioned on the shortest route from the starting place to this reference node and directly connected to the reference node. Then, the optimum route search unit 6 calculates the reach cost for the reach node which is positioned on the forward end of the reach link selected at the step S203 (step S204). FIG. 11 shows the cost calculation processing at the step S204.

Referring to FIG. 11, the optimum route search unit 6 determines whether or not the current reference node is an integrated node (step S301). This integration processing has been described in detail with reference to FIGS. 2 and 6(A) to 8(D), and hence redundant description is omitted. When the current reference node is not an integrated one, the optimum route search unit 6 sets a general cost for moving from the reference node to a progress link (link from the reference node to the reach node) as the passage cost for the reference node (step S302). When the current reference node is an integrated one, on the other hand, the optimum route search unit 6 sets the reach link for the reference node and the progress link from the reference node as the approach link and the escape link respectively, and retrieves a passage cost in the integrated reference node by referring to the passage link table shown in FIG. 7(C) or 8(D) (step S303). Then, the optimum route search unit 6 adds up the minimum reach cost (already calculated and recorded in the internal memory) from the starting place to the current reference node, the passage cost (obtained at the step S302 or S303) of the reference node, and the passage cost of the progress link, to calculate the reach cost for the reach node (step S304). Thereafter the optimum route search unit 6 returns to the route search processing routine shown in FIG. 10.

Referring again to FIG. 10, the optimum route search unit 6 determines whether or not the reach cost calculated at the step S204 is the minimum one among the reach costs theretofore calculated with respect to the reach node (step S205). If the calculated reach cost is the minimum one, the optimum route search unit 6 reloads the reach cost of the reach node stored in the internal memory with that calculated at the step S204, while reloading the reach link of the reach node with a link from the current reference node to the reach node (step S206). If the calculated reach cost is not the minimum one, on the other hand, the optimum route search unit 6 advances to processing at the step S207 without reloading the reach cost and the reach link of the reach node.

Then, the optimum route search unit 6 determines whether or not unselected links remain among the links approachable from the current reference node (step S207), and repeats the processing at the steps S203 to S207 again as to the remaining links when unselected links remain. When the reach costs for the respective reach nodes are completely calculated as to all links, the optimum route search unit 6 sets a node having the minimum reach cost as a next reference node among the nodes which are not reference nodes but reach costs thereof have already been calculated (step S208). Then, the optimum route search unit 6 determines whether or not the reference node is set at the step S208 (step S209), to return to the operation at the step S202 when the reference node is set, and executes the processing of the steps S203 to S209 on the newly set reference node.

When the newly set reference node is the target node, the optimum route search unit 6 executes route formation processing at a step S211. This route formation processing is adapted to ascertain the shortest route from the starting place to the destination as viewed from the destination, as shown in FIG. 12 in detail.

Figure 12:
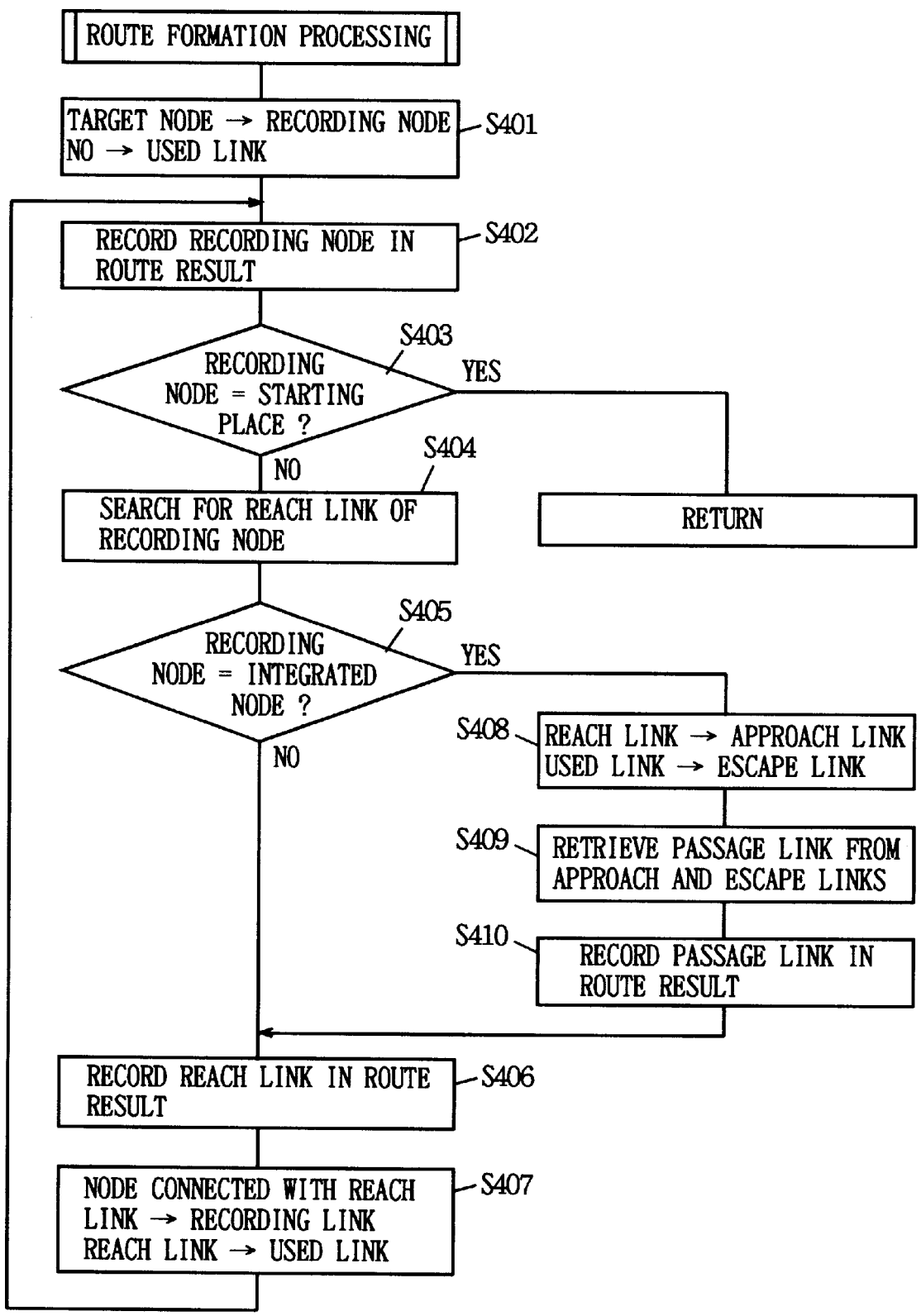
FIG. 12 is a flow chart showing the operation at a subroutine step S211 appearing in FIG. 9 in detail.

Referring to FIG. 12, the optimum route search unit 6 first sets the target node as a recording node, while setting no used link (step S401). Then, the optimum route search unit 6 records the recording node in a route result formation region of the internal memory (the target node is recorded as the recording node at first). Then, the optimum route search unit 6 determines whether or not the current recording node is the starting place (step S403). When the recording node is not the starting place, the optimum route search unit 6 refers to the internal memory, to retrieve the reach link of the current recording node (step S404). Then, the optimum route search unit 6 determines whether or not the current recording node is an integrated recording node (step S405). If the current recording node is not an integrated one, the optimum route search unit 6 records the reach link of the recording node retrieved at the step S404 in the route result formation region of the internal memory (step S406). Then, the optimum route search unit 6 records another node which is connected with the reach link and this reach link as a next recording node and a node used by the next recording node in the route result formation region of the internal memory respectively (step S407). Thereafter the optimum route search unit 6 returns to the operation at the step S402.

When the current recording node is an integrated one, on the other hand, the optimum route search unit 6 sets the reach link of the current recording node and the used link as an approach link and an escape link respectively (step S408). Then, the optimum route search unit 6 refers to the passage link table shown in FIG. 7(C) or 8(D), to retrieve a passage link in the integrated recording node from the relation between the approach link and the escape link (step S409). Then, the optimum route search unit 6 records the retrieved passage link in the route result formation region of the internal memory (step S410). Thereafter the optimum route search unit 6 advances to the operation at the step S406.

The operations at the steps S402 to S410 are repeated to go back through the reach links of the respective nodes from the target node, thereby forming the shortest route from the starting place to the destination. When the recording node coincides with the starting place, the optimum route search unit 6 completes the route formation processing shown in FIG. 12, and returns to the route search processing routine of FIG. 10. Thereafter the optimum route search unit 6 returns to the main routine shown in FIG. 9, displays the shortest route as formed on the output unit 9 through the output data generation unit 8 (step S107), and completes its operation.

FIG. 13 illustrates roads which are preferably integrated with each other in creation of the route selection data from the original data. Referring to (A) to (E) in FIG. 13, roads extending at spaces below constant distances, crossings which are present in a constant range (shown in a dotted line), interchanges or ramps, junctions and crossings of the same name are integrated with each other respectively.

Referring to (F) in FIG. 13, further, crossings having a specific traffic control which cannot be expressed in the original data are integrated with each other, so that the traffic control can be expressed. In the road system before integration shown at (F) in FIG. 13, for example, the car can approach the upper road from the lower road in vertically extending roads, while the same is inhibited from turning to the right for approaching the horizontally extending road from the lower road. In the original data, the respective roads are stored in a vectorized manner and hence the aforementioned traffic control over a plurality of crossings cannot be expressed. In the route selection data, on the other hand, such a traffic control can be expressed by not describing the relation between the lower one of the vertically extending roads regarded as an approach link and the right one of the horizontally extending roads regarded as a escape link or providing a flag expressing inhibition of progress, since the passage link table describes the relations between the approach links and the escape links as to the integrated crossings as shown in FIG. 7(C).

While the optimum route search unit 6 employs the Dijkstra method in the aforementioned embodiment, another route search method may alternatively be employed. While the route selection data are read from the route selection data storage unit 4 in advance of the search, the data may alternatively be read during the search or the range for the search may not be previously limited.

(Second Embodiment)

FIG. 14 is a block diagram showing a route selection system according to a second embodiment of the present invention. Referring to FIG. 14, the route selection system according to this embodiment comprises a position detection data storage unit 10, a position detection unit 20, a traffic information input unit 30, a route selection data storage unit 40, a starting route decision data storage unit 41, a spot input unit 50, a starting route selection unit 61, a total route selection unit 62, a map display data storage unit 70, an output data generation unit 80, and an output unit 90.

The position detection data storage unit 10 includes a recording medium such as a CD-ROM, and stores position detection data describing a detailed road system for detecting the current position of the car.

The position detection unit 20 obtains the general position and locus of the car through the speed of the car, the angle of its turn and an electric wave (GPS) from a satellite, and refers to the position detection data stored in the position detection data storage unit 10 to correctly obtain the current position of the car.

The traffic information input unit 30 includes a receiver, a modem etc. and receives traffic information which is transmitted through the electric wave or a telephone line to input the received data in the starting route selection unit 61 and the total route selection unit 62.

The route selection data storage unit 40 includes a recording medium such as a CD-ROM, and stores route selection data employed for selecting the optimum route. The route selection data include data of the road system, and data indicating correspondence between the traffic information received from the traffic information input unit 30 and the roads.

The starting route decision data storage unit 41 includes a recording medium such as a CD-ROM, and stores data employed for deciding the first part of the route from the current position of the car to the destination. The data include evaluation values (traveling times etc.) required for passing through specific spots.

The spot input unit 50 operates in response to the user's operation, to input the destination as a target of the route in the starting route selection unit 61 and the total route selection unit 62 (and the starting place if necessary).

The starting route selection unit 61 obtains a starting route on the basis of the route selection data stored in the route selection data storage unit 40, the traffic information inputted from the traffic information input unit 30, and the evaluation data between the specific spots inputted from the starting route decision data storage unit 41. This starting route is a route which is present on the route from the starting place to the destination in the vicinity of the starting place, such as a route having a traveling time of about 5 minutes, for example. The current position of the car which is detected by the position detection unit 20 or starting place information which is inputted from the spot input unit 50 is employed as the starting place. On the other hand, destination information which is inputted from the spot input unit 50 is employed as the destination.

The total route selection unit 62 obtains the optimum route to the destination following the starting route on the basis of the route selection data stored in the route selection data storage unit 40, the traffic information inputted from the traffic information input unit 30, the destination information inputted from the spot input unit 50, and the starting route obtained in the starting route selection unit 61.

The map display data storage unit 70 includes a recording medium such as a CD-ROM, and stores map display data including shapes of roads, lands, harbors, rivers and parks on the map.

The output data generation unit 80 refers to the map display data stored in the map display data storage unit 70, thereby generating image data for displaying the current position of the car obtained in the position detection unit 20 and the map of its vicinity, or the map of a range desired by the user. If the starting route obtained by the starting route selection unit 61 or the route obtained in the total route selection unit 62 is included in the displayed range, the output data generation unit 80 also generates its image data. Further, the output data generation unit 80 outputs guidance information for guiding the car, such as voice information and/or display information, "turn to the right at the crossing 100 m ahead", for example, on the basis of the current position of the car, the selected starting route and the optimum route to the destination.

The output unit 90 includes a display and a speaker, for displaying and voice-outputting the image data and the voice information supplied from the output data generation unit 80.

Figure 15A:
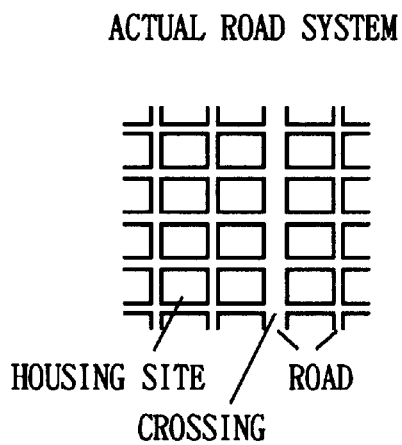
FIGS. 15(A) and 15(b) illustrate an exemplary expression mode of route selection data in the embodiment shown in FIG. 14.
Figure 15B:
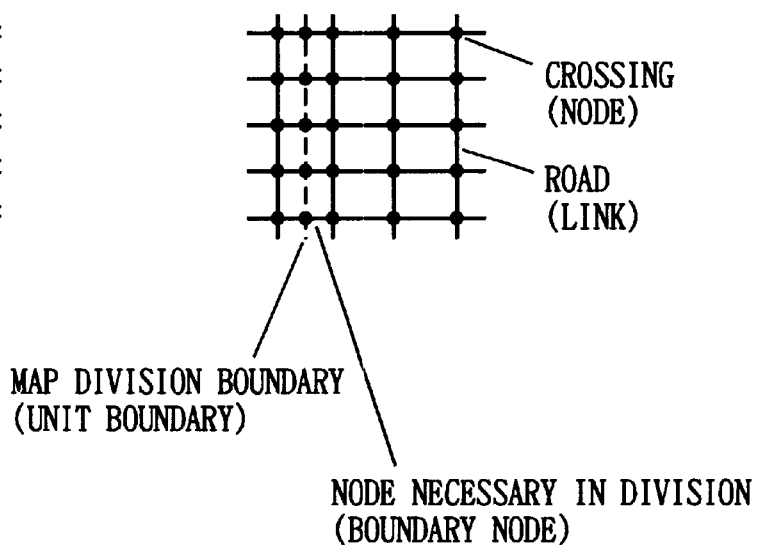

With reference to FIGS. 15(A) and 15(B), the route selection data stored in the route selection data storage unit 40 shown in FIG. 14 are described.

FIG. 15(A) illustrates an example of an actual road system. As shown in FIG. 15(A), the road system can be divided into roads which allow passage of the car, crossings which are present in places where the roads intersect with each other, and housing sites (houses, parks etc.) which are enclosed with the roads. In order to obtain the route from the starting place to the destination, it is necessary to extract the roads and the crossings from the actual road system, for previously creating data which are suitable for obtaining the route. The extracted data are called route selection data, as shown in FIG. 15(B). The data express the crossings and the roads between the crossings as points (nodes) and links indicating that the car can pass through the nodes respectively. Since it is difficult to continuously record all parts of Japan in consideration of the data quantity, the route selection data record the roads in a divided manner by partitioning the same every constant range (in units of log. 7'30" and lat. 5' as in the map on a scale of 1 to 25,000 issued by the Geographical Survey Institute, for example). The partitions are called units, and nodes which are set for dividing the links on boundaries between the units are called boundary nodes.

Figures 16A, 16B:
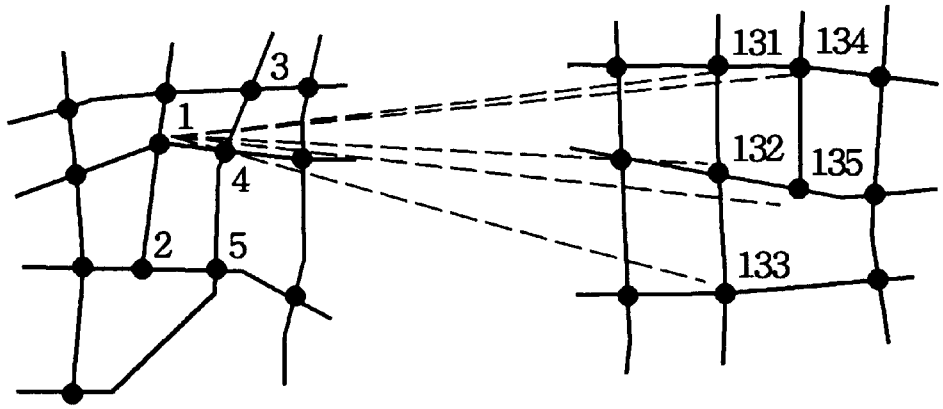
FIGS. 16(A) and 16(B) illustrate relations between a road system and a recording mode of starting route decision data in the embodiment shown in FIG. 14.

With reference to FIGS. 16(A) and 16(B), the starting route decision data stored in the starting route decision data storage unit 41 shown in FIG. 14 are now described.

First, the nodes which are stored in the route selection data are numbered (see FIG. 16(A)). The optimum routes between the respective nodes are obtained and the costs therefor are stored as to all crossings (see FIG. 16(B)). As to the costs, estimated traveling times are calculated when the optimum routes are the minimum traveling times, while the total distances of the routes are calculated when the optimum routes are the shortest distance routes. Data recording the costs for the optimum routes between all nodes are called starting route decision data.

While the costs between the nodes are employed as the starting route decision data in the second embodiment, the same may be replaced by costs between the respective links or between the boundary nodes, or costs between a starting place of a boundary node and a destination of a crossing.

The starting route selection unit 61 shown in FIG. 14 selects the starting route, which is the first route from the current position of the car, through these data. The operation of the starting route selection unit 61 is now described with reference to FIGS. 17(A) to 17(D).

The starting route selection unit 61 reads the route selection data in the vicinity of the current position from the route selection data storage unit 40 on the basis of the current position of the car which is inputted from the position detection unit 20. The starting route selection unit 61 searches for the optimum route as to each node in the range of constant conditions, such as a range approachable in 5 minutes, for example, about the current position. When a well-known shortest route search method such as the Dijkstra method is employed, for example, the optimum routes for all nodes within the constant range from the current position can be obtained by a single search (see FIG. 17(A)).

Figure 17A:
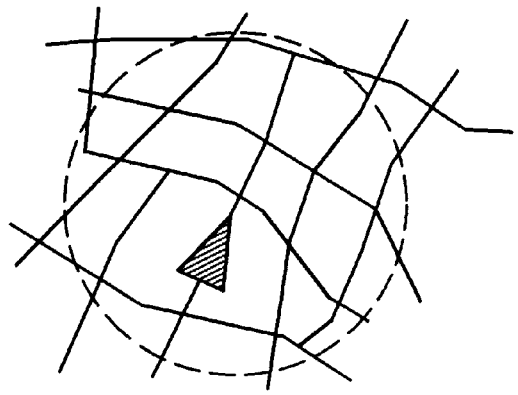
FIGS. 17(A) to 17(D) are adapted to illustrate an operation for obtaining the starting route in the embodiment shown in FIG. 14.
Figure 17B:
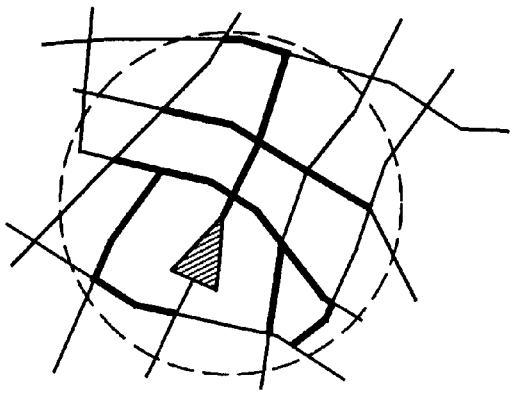

Thus, the starting route selection unit 61 obtains the optimum routes (see FIG. 17(B)) to the respective nodes in the searched range from the current position and the costs (necessary times in this case) for reaching the nodes.

Figure 17C:
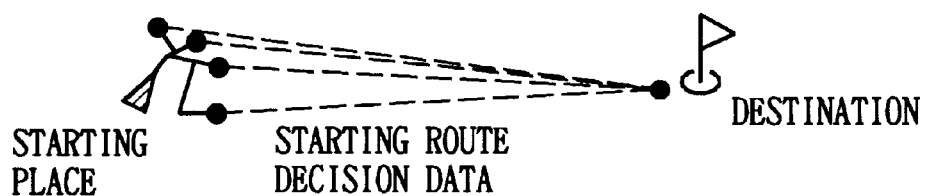

Then, the starting route selection unit 61 reads the starting route decision data from the starting route decision data storage unit 41, in order to examine a reach cost for the node which is approximate to the destination (inputted by the spot input unit 50) from the nodes as searched (see FIG. 17(C)). Then, the starting route selection unit 61 obtains a node in the search range having the minimum total sum of the cost from the current position to the node obtained by the search and the cost from the node obtained by the starting route decision data to the node approximate to the destination.

Figure 17D:
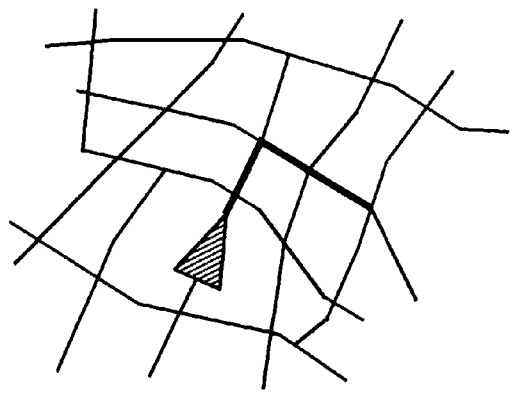

Then, the starting route selection unit 61 displays the optimum route to the node having the minimum total sum from the current position obtained by the previous search on the output unit 90 through the output data generation unit 80 as the starting route (see FIG. 17(D)).

In order to select the optimum route in consideration of the traffic information in the search from the current position, the traffic information may be inputted from the traffic information input unit 30 so that the optimum route is obtained after increasing the traveling time for passing through a congested link, for example.

It is possible to delete a time (several seconds) required for reading the data from the CD-ROM from the waiting time in the starting route selection by reading the route selection data and the starting route decision data for the search while the user inputs the destination through the spot input unit 50.

While the starting route decision data stored in the starting route decision data storage unit 41 record all nodes as starting places, only the aforementioned boundary nodes may alternatively be recorded as the starting places, in order to reduce the data quantity. While the starting route decision data similarly record all nodes as destinations, the nodes may be alternatively so thinned that one spot is formed by units to reduce the quantity of the stored data, since the decision of the starting route is hardly influenced by a small error on the destination side.

Figure 18:
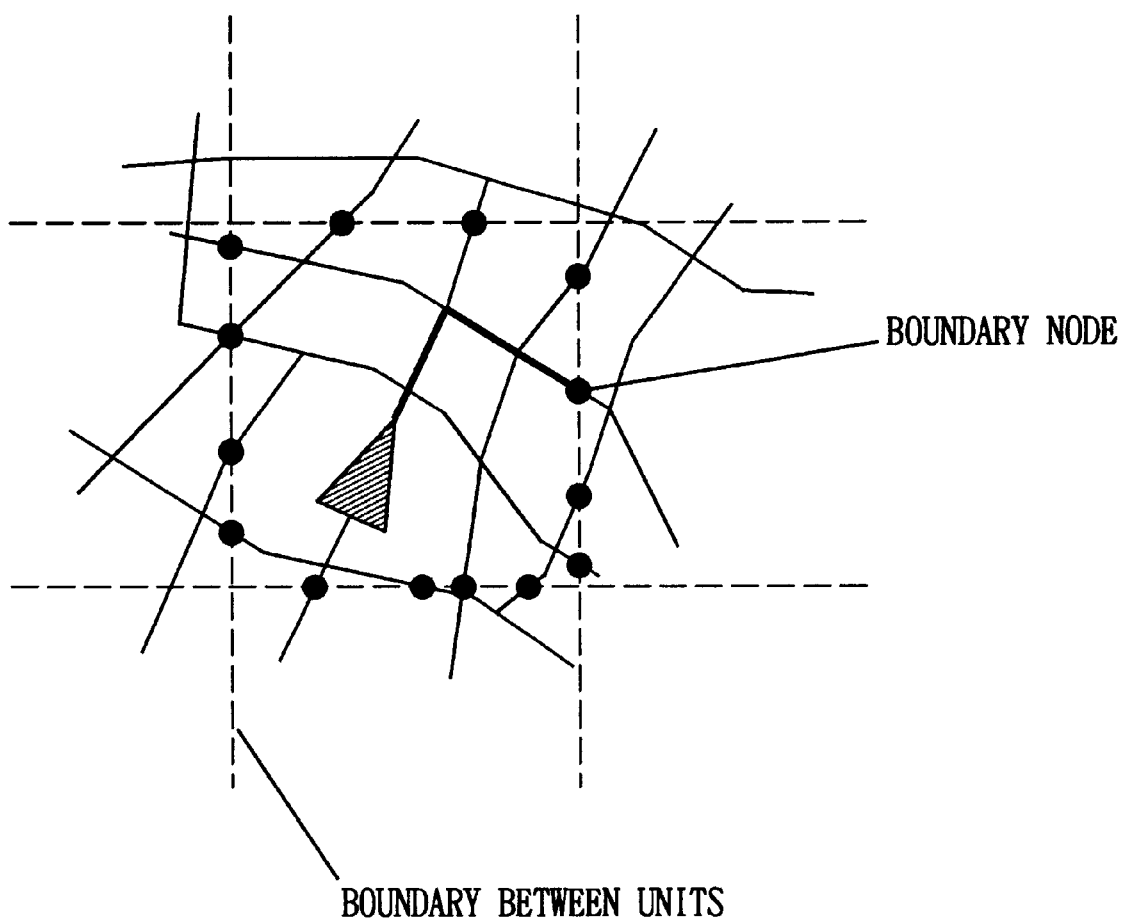
FIG. 18 illustrates exemplary search conditions for the starting route.

It is possible to prevent the possibility of requirement for a U-turn with respect to the optimum route to the destination which is obtained after the car travels along the starting route by carrying out the search from the current position as to all nodes, including the boundary nodes, in the route selection data read in units and selecting the starting route to the boundary node, as shown in FIG. 18.

The starting route decision data may not be stored but a route which is most coincident to the direction of the destination may be selected as the starting route from the optimum route from the current position to the respective nodes in the constant range obtained by the search.

Alternatively, the one-line distance between the terminal position of the optimum route and the destination may be obtained to obtain a reach evaluation value, such as a time required for traveling along the route at 60 km an hour, for example, which is estimated necessary for traveling along the one-line distance, so that a route having the minimum total reach evaluation value between the current position and the destination is selected as the starting route.

While the starting route decision data record the reach evaluation value between two spots, a passage spot to be passed halfway may alternatively be recorded so that this spot is regarded as a temporary destination for selecting the starting route. Alternatively, the obtained optimum routes may be successively displayed so that the user selects one of these routes as the starting route, for example.

The total route selection unit 62 shown in FIG. 14 selects the optimum route to the destination in accordance with the starting route selected by the starting route selection unit 61, while the user is guided by the output unit 90. With reference to FIGS. 19(A) to 19(D), the operation of the total route selection unit 62 is now described.

Figure 19A:
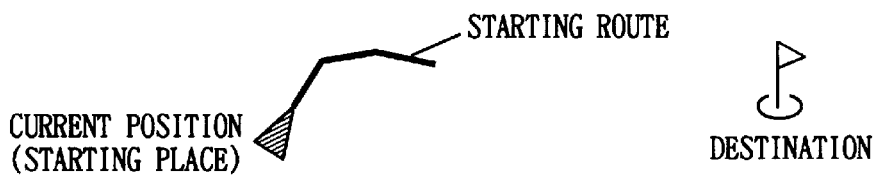
FIGS. 19(A) to 19(D) are adapted to illustrate an operation for obtaining a total route in the embodiment shown in FIG. 14.

FIG. 19(A) illustrates an exemplary state of the starting route, selected by the starting route selection unit 61, which is outputted from the output unit 90 through the output data generation unit 80. At this point of time, the user can obtain information as to how to start his car from the current position by a guidance based on the starting route.

Figure 19B:
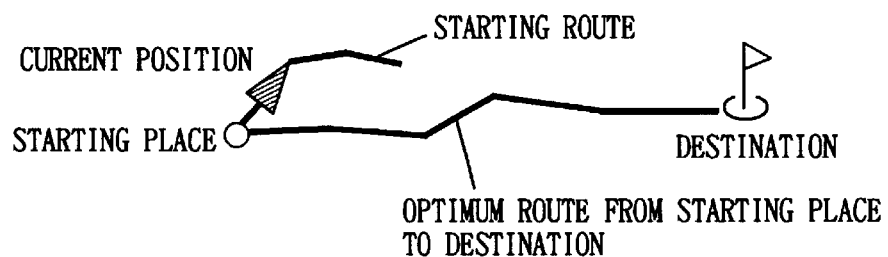

During this guidance, the total route selection unit 62 first obtains the optimum route from the starting place (the current position in this case) to the destination through the result of the selected starting route, the destination information inputted from the spot input unit 50, the route selection data stored in the route selection data storage unit 40, and the traffic information inputted from the traffic information input unit 30. FIG. 19(B) illustrates an exemplary optimum route from the starting place to the destination selected at this time.

Since at least one minute is necessary for obtaining the optimum route from the starting place to the destination in general, the car moves from the starting place to another position on the basis of the guidance as to the starting route. Further, the starting route may differ from the optimum route from the starting place to the destination. Therefore, the total route selection unit 62 must first select the optimum route, called a first route, from the starting place to the destination and thereafter select a route, called a second route, for reaching the optimum route from the current position of the car.

Figure 19C:
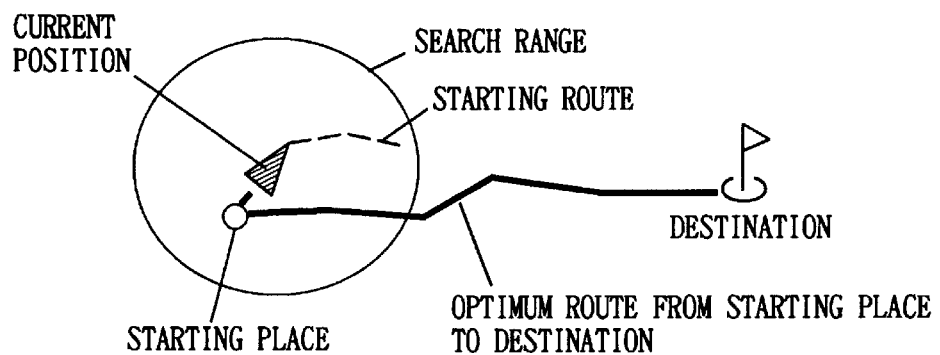
Figure 19D:
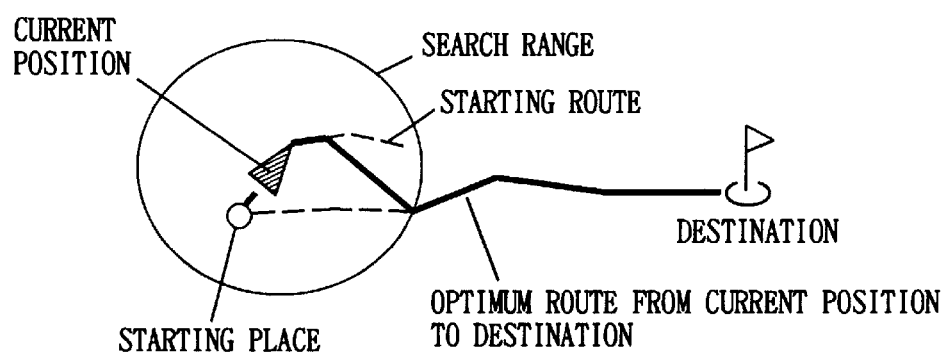

After selection of the first route, therefore, the total route selection unit 62 searches a range of constant conditions (spots of estimated reach times of 5 minutes, for example) from the current position of the car, as shown in FIG. 19(C). Then, the total route selection unit 62 searches for a link which is present on the first route over the boundary of the searched range, as shown in FIG. 19(D). Then, the total route selection unit 62 obtains the optimum route from the current position to the link on the boundary on the basis of the result of the search, and regards the route as the second route for reaching the first route from the current position. Then, the total route selection unit 62 uses the previously obtained first route from the link on the boundary to the destination as the optimum route from the current position to the destination. Thereafter, the currently obtained route is outputted from the total route selection unit 62, to be used as the route for guiding the car in the output data generation unit 80 in place of the starting route.

While the total route selection unit 62 searches the range of constant conditions from the current position to obtain the second route for reaching the first route, the search may alternatively be stopped when the search range reaches the first route, so that a route to a spot allowing the quickest reach to the first route is selected as the second route.

Thus, the method of selecting the second route for reaching the first route from the current position can be usefully employed also in an apparatus selecting no starting route, in general. When the traveling course is displaced from the optimum route or the car moves from the starting place during the search for the optimum route, for example, it is necessary to obtain a road for returning to the optimum route, and the aforementioned method can be employed in this case.

Figure 20:
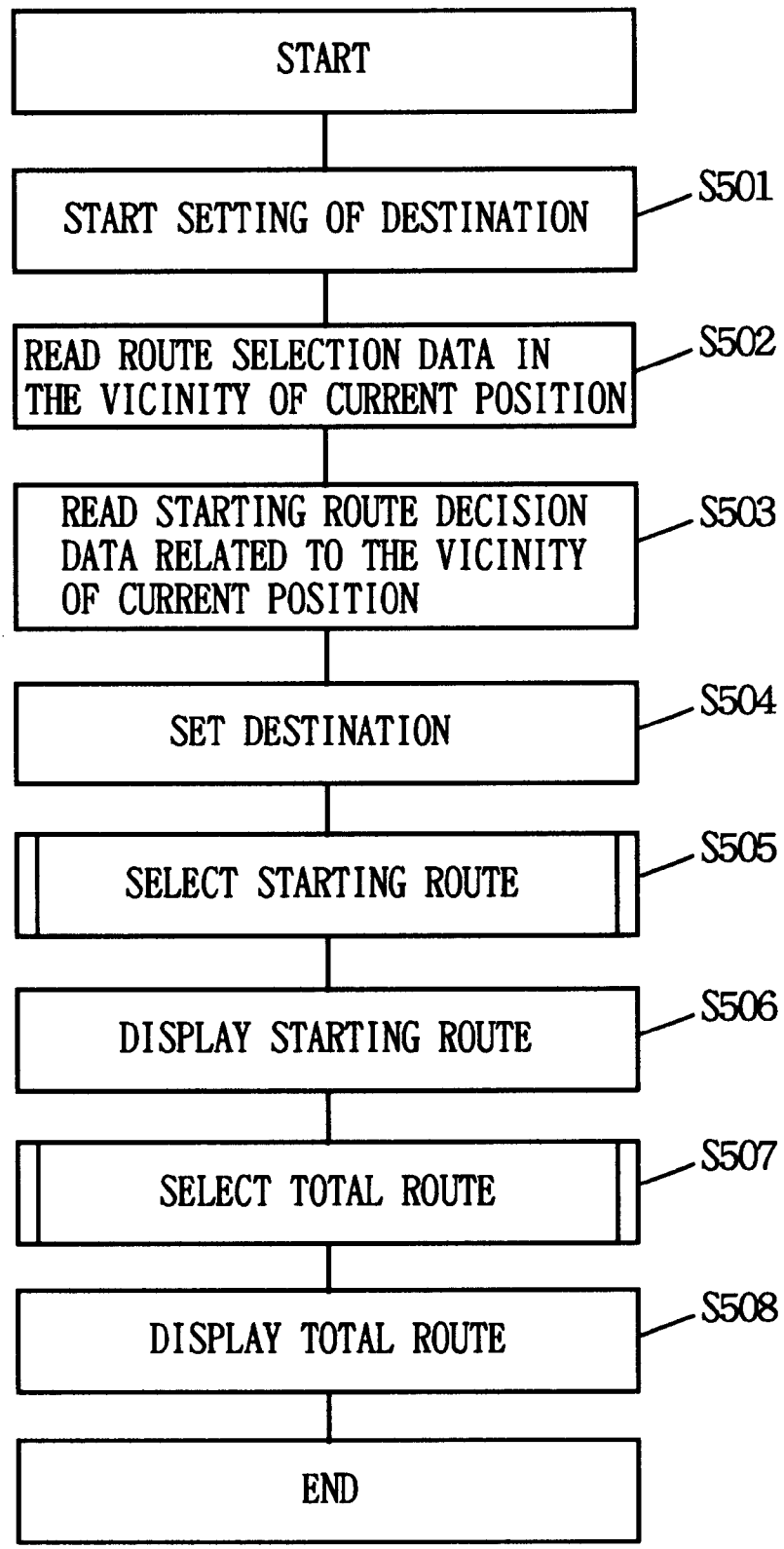
FIG. 20 is a flow chart showing the operation of the embodiment shown in FIG. 14.
Figure 21:
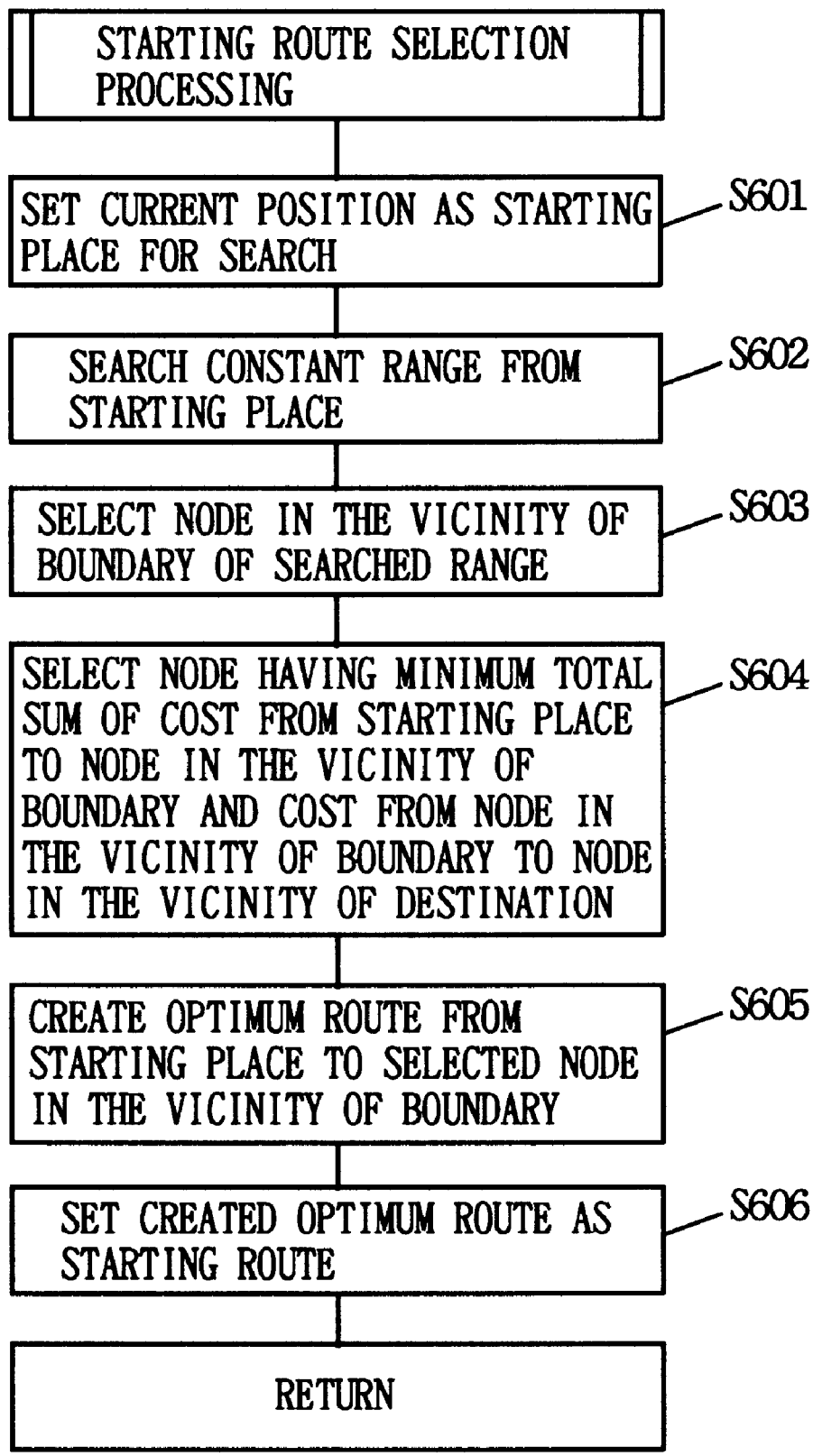
FIG. 21 is a flow chart showing the operation at a subroutine step S505 appearing in FIG. 20 in detail.
Figure 22:
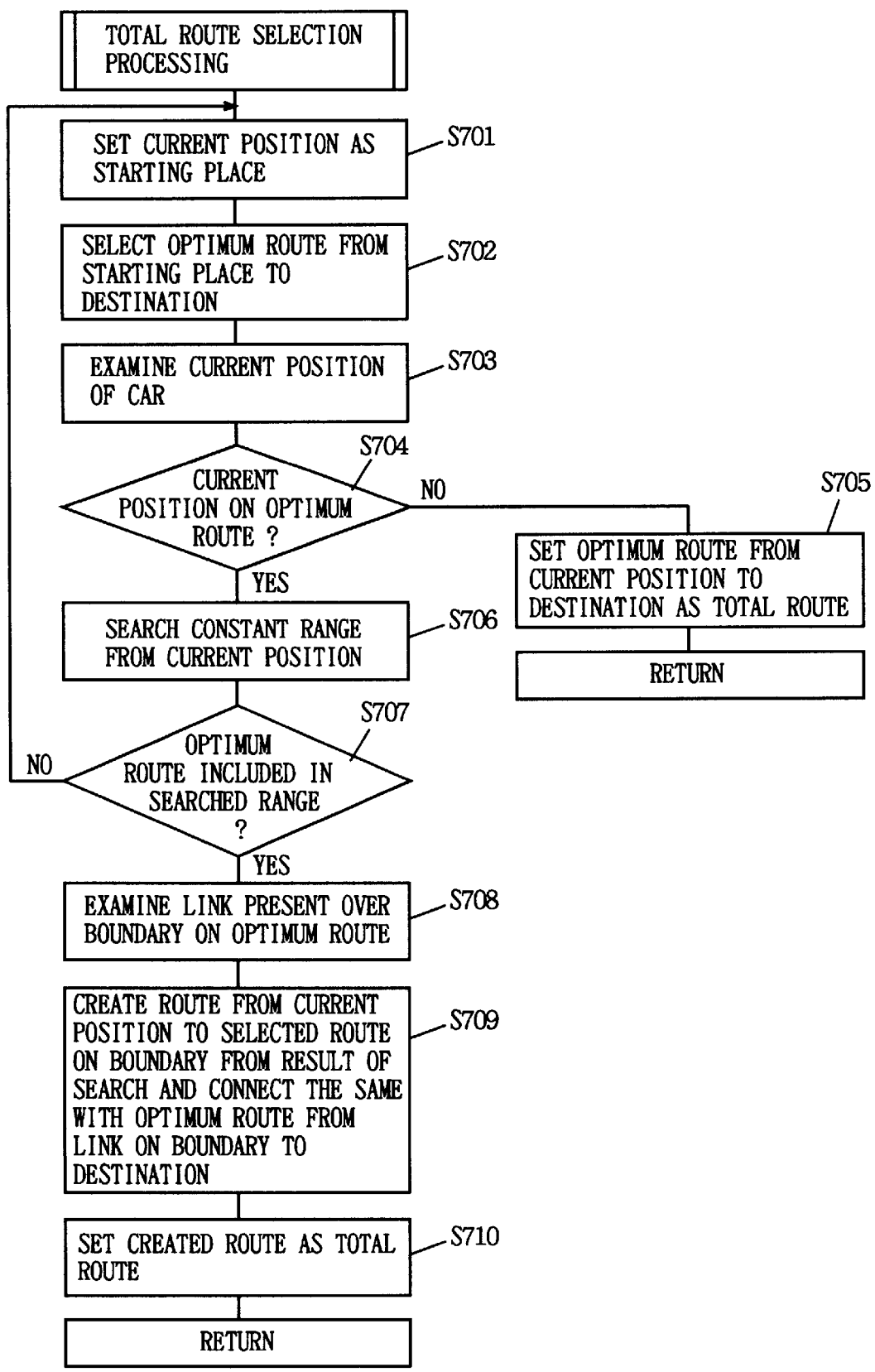
FIG. 22 is a flow chart showing the operation at a subroutine step S507 appearing in FIG. 20 in detail.

FIGS. 20 to 22 a reflow charts showing the operation of the starting route selection system shown in FIG. 14. The route selection operation in the starting route selection system of FIG. 14 is now described with reference to FIGS. 20 to 22. For example, this method is adapted to select a route for reaching the destination inputted by the user in the minimum traveling time from the current position of the car. No traffic situation is used, for the purpose of simplification.

The operation (steps S501 to S506) of the starting route selection unit 61 is now described. The starting route selection unit 61 detects that the user operates the spot input unit 50 to input the destination (step S501), and reads route selection data necessary for searching for the route in the vicinity of the current position of the car from the route selection data storage unit 40 (step S502).

Then, the starting route selection unit 61 reads starting route decision data in relation to a node in the vicinity of the starting place from the starting route decision data storage unit 41 (step S503). Then, the starting route selection unit 61 inputs position coordinates (the longitude and the latitude) as to the destination set by the user through the spot input unit 50 during this time (step S504).

Then, the starting route selection unit 61 selects the starting route (step S505). The starting route selection processing at the step S505 is executed by a well-known shortest route search method such as the Dijkstra method.

FIG. 21 shows the processing at the step S505 in detail. Referring to FIG. 21, the starting route selection unit 61 inputs the coordinates (the longitude and the latitude) of the current position of the car and its traveling direction from the position detection unit 20, and sets the current position as the starting place for the route search (step S601).

Then, the starting route selection unit 61 searches for optimum routes as to all nodes (or links) up to a predetermined range of constant conditions (to a range having an estimated reach time of 5 minutes from the starting place, for example) through the already read route selection data (step S602). Due to this search, it is possible to recognize the traveling times and the optimum routes from the starting place as to all nodes (or links) in the searched range.

Then, the starting route selection unit 61 selects a node (boundary node) which is present in the search range among those provided on both ends of a link extending over the boundary of the searched range (step S603). Thereafter the starting route selection unit 61 examines the traveling time for reaching the boundary node from the starting place on the basis of the result of the aforementioned search. Further, the starting route selection unit 61 examines the traveling time for reaching a node in the vicinity of the destination from the boundary node on the basis of the read starting route decision data. Then, the starting route selection unit 61 selects the boundary node having the minimum total sum of these traveling times (step S604). Then, the starting route selection unit 61 obtains the optimum route from the starting place to the boundary node selected at the step S604 on the basis of the result of the aforementioned search (step S605). Then, the starting route selection unit 61 sets the route obtained at the step S605 in the total route selection unit 62 and the output data generation unit 80 as the starting route (step S606). Thereafter the starting route selection unit 61 returns to the operation of FIG. 20.

Referring again to FIG. 20, the output data generation unit 80 creates display data for displaying the starting route obtained by the starting route selection unit 61, and displays the starting route on the output unit 90 (step S506), thereby guiding the user.

Then, the total route selection unit 62 obtains the optimum route from the current position to the destination (step S507). The total route selection processing at the step S507 is executed by a well-known shortest route search method such as the Dijkstra method.

FIG. 22 shows the processing at the step S507 in detail. Referring to FIG. 22, the total route selection unit 62 inputs the coordinates (the longitude and the latitude) of the current position of the car and its traveling direction from the position detection unit 20, and sets the current position as the starting place of the route search (step S701).

Then, the total route selection unit 62 inputs the coordinates (the longitude and the latitude) of the destination from the spot input unit 50, and reads the route selection data from the read selection data storage unit 40 at need, to obtain the optimum route from the starting place to the destination (step S702). Since at least several ten of seconds are required for carrying out the step S702, the car moves from the first starting place to another position in accordance with the guidance based on the starting route during this time.

After the optimum route to the destination is obtained, therefore, the total route selection unit 62 again inputs the current position of the car from the position detection unit 20 (step S703). Then, the total route selection unit 62 determines whether or not this current position is present on the optimum route (step S704). If the car remains on the first starting place or travels along the optimum route obtained at the step S702, for example, the determination at the step S704 is of YES. In this case, the optimum route from the current position of the car to the destination has already been obtained and hence the total route selection unit 62 sets this route in the output generation unit 80 as the total route (step S705). Thereafter the total route selection unit 62 returns to the operation of FIG. 20.

If the car moves from the first starting place and does not travel along the obtained optimum route from the starting place to the destination when the starting route is not the optimum route to the destination, for example, the determination at the step S704 is of NO. In this case, optimum routes are searched for as to all nodes (or links) up to a range of constant conditions (a range requiring an estimated reach time of 5 minutes from the current position, for example) from the current position of the car (step S706). Then, the total route selection unit 62 determines whether or not the searched range includes the optimum route to the destination obtained at the step S702 (step S707). If the searched range includes no link which is present on the optimum route to the destination, the determination at the step S707 is of NO and the total route selection unit 62 again returns to the step S701 to obtain the optimum route from the current position of the car to the destination again.

When the range searched at the step S707 includes a link which is present on the optimum route to the destination, on the other hand, the determination at the step S707 is of YES. In this case, the total route selection unit 62 finds out a link which is present on the boundary between the searched range and an unsearched range and provided on the optimum route obtained at the step S702 (step S708). On the basis of the result of this search, the total route selection unit 62 obtains the optimum route to the link provided on the boundary which is found out at the step S708 from the current position. Further, the total route selection unit 62 extracts a part of the route from the link provided on the boundary to the destination from the optimum route from the starting place to the destination obtained at the step S702. Then, the total route selection unit 62 connects the optimum route from the current position to the link provided on the boundary with the optimum route from the link provided on the boundary to the destination, to define a single route from the current position to the destination (step S709). Then, the total route selection unit 62 sets the route created by such connection in the output data generation unit 80 as the total route (step S710). Thereafter the total route selection unit 62 returns to the operation of FIG. 20.

Referring again to FIG. 20, the output data generation unit 80 creates display data for displaying the total route from the current position to the destination which is set at the aforementioned step S710. The display data are supplied to the output unit 90, to be displayed (step S508). Thus, the user is guided through the total route, in place of the starting route previously obtained in the starting route selection unit 61. Thereafter the system completes its operation.

While the Dijkstra method is employed in the starting route selection unit 61 and the total route selection unit 62 in the aforementioned embodiment, another route search method may alternatively be employed.

(Third Embodiment)

FIG. 23 is a block diagram showing a route selection system according to a third embodiment of the present invention. Referring to FIG. 23, the route selection system according to this embodiment comprises a position detection data storage unit 100, a position detection unit 200, a traffic information input unit 300, a route selection data storage unit 400, a spot input unit 500, a route selection unit 600, a map display data storage unit 700, an output data generation unit 800, and an output unit 900.

The position detection data storage unit 100 includes a recording medium such as a CD-ROM, and stores position detection data describing a detailed road system employed for detecting the current position of the car.

The position detection unit 200 obtains the general position and locus of the car through the speed of the car, the angle of its turn and an electric wave (GPS) from a satellite, and refers to the position detection data stored in the position detection data storage unit 100 to correctly obtain the current position of the car.

The traffic information input unit 300 includes a receiver, a modem etc. and receives traffic information which is transmitted through the electric wave or a telephone line to input the same in the route selection unit 600.

The route selection data storage unit 400 includes a recording medium such as a CD-ROM, and stores route selection data employed for selecting the optimum route. The route selection data include: (1) data of the road system, (2) route number data recorded in correspondence to respective roads, and (3) data indicating correspondence between the traffic information inputted from the traffic information input unit 300 and the roads.

The spot input unit 500 operates in response to the user's operation, to input the destination in the route selection unit 600 (and the starting place, if necessary).

The optimum route search unit 600 obtains the optimum route from the starting place to the destination through the route selection data stored in the route selection data storage unit 400 and the traffic information inputted from the traffic information input unit 300. The current position of the car detected by the position detection unit 200, or starting place information inputted from the spot input unit 500 is employed as the starting place. On the other hand, destination information inputted from the spot input unit 500 is employed as the destination.

The map display data storage unit 700 includes a recording medium such as a CD-ROM, and stores map display data including shapes of roads, lands, harbors, rivers and parks on the map.

The output data generation unit 800 refers to the map display data stored in the map display data storage unit 700, thereby generating image data for displaying the current position of the car obtained in the position detection unit 200 and the map of its vicinity, or that of a range desired by the user. If the route obtained by the route selection unit 600 is included in the displayed range, the output data generation unit 800 also generates its image data. Further, the output data generation unit 800 outputs guidance information for guiding the car, such as voice information and/or display information, "turn to the right at the crossing 100 m ahead", for example, on the basis of the current position of the car and the selected optimum route.

The output unit 900 includes a display and a speaker, for displaying and voice-outputting the image data and the voice information supplied from the output data generation unit 800.

FIGS. 24(A) and 24(B) are explanatory diagrams related to the route selection data. With reference to FIGS. 24(A) and 24(B), the route selection data stored in the route selection data storage unit 400 shown in FIG. 23 are described.

FIG. 24(A) illustrates an example of an actual road system. As shown in FIG. 24(A), the road system can be divided into roads which allow passage of the car, crossings which are present in places where the roads intersect with each other, and housing sites (houses, parks etc.) which are enclosed with the roads. In order to obtain the route from the starting place to the destination, it is necessary to extract the roads and the crossings from the actual road system, for previously creating data which are suitable for obtaining the route. The extracted data are called route selection data, as shown in FIG. 24(B). The data express the crossings and the roads between the crossings as points (nodes) and links indicating that the car can pass through the nodes respectively. Since it is difficult to continuously record all parts of Japan in consideration of the data quantity, the route selection data record the road system in a divided manner by partitioning the same every constant range (in units of long. 7'30" and lat. 5' as in the map on a scale of 1 to 25,000 issued by the Geographical Survey Institute, for example). The partitions are called units.

With reference to FIGS. 25(A) and 25(E), information which is also recorded in the route selection data is now described. FIG. 25(A) illustrates an exemplary road system. This road system includes Routes 12 and 321 connecting cities with each other and general roads provided around the same. In this case, the roads connecting the cities with each other are recorded along with route numbers. For example, the eastward and westward links of the Route 12 are provided with route numbers r5 and r6 respectively. Further, the northward and southward links of the Route 321 are provided with route numbers r11 and r12 respectively. Thus, the route selection data record route numbers as to respective ones of the roads which are continuously connected with each other. It may alternatively be possible to determine whether or not the roads are continuously connected with each other through the numbers of the Routes or prefectual roads, or in units of road names. The route numbers for the same roads are preferably distinguished from each other by setting even numbers and odd numbers for those mainly directed to the southwest and to the northeast respectively, for example.

FIG. 25(B) illustrates an exemplary data format of the aforementioned route selection data. Each link is indicated by a combination of two nodes such as a and b, for example, and the route number is provided depending on which end of the node is regarded as the starting point. It is preferable to also record the names of the roads corresponding to the links and traveling times required for passing through the links with the car.

Figure 26:
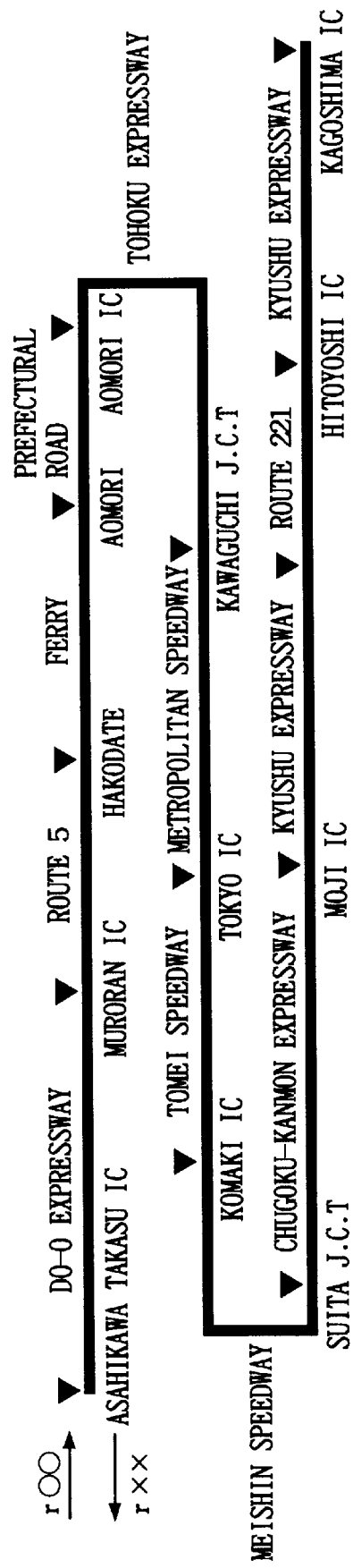
FIG. 26 is adapted to illustrate relations between roads and route numbers in the route selection data.

As to the association of the route numbers, not only the Routes of the same numbers but principal roads from Hokkaido to Kyushu may be connected with each other on the basis of those connecting cities to number the roads for defining a large-scale route as shown in FIG. 26, for example.

Figure 27:
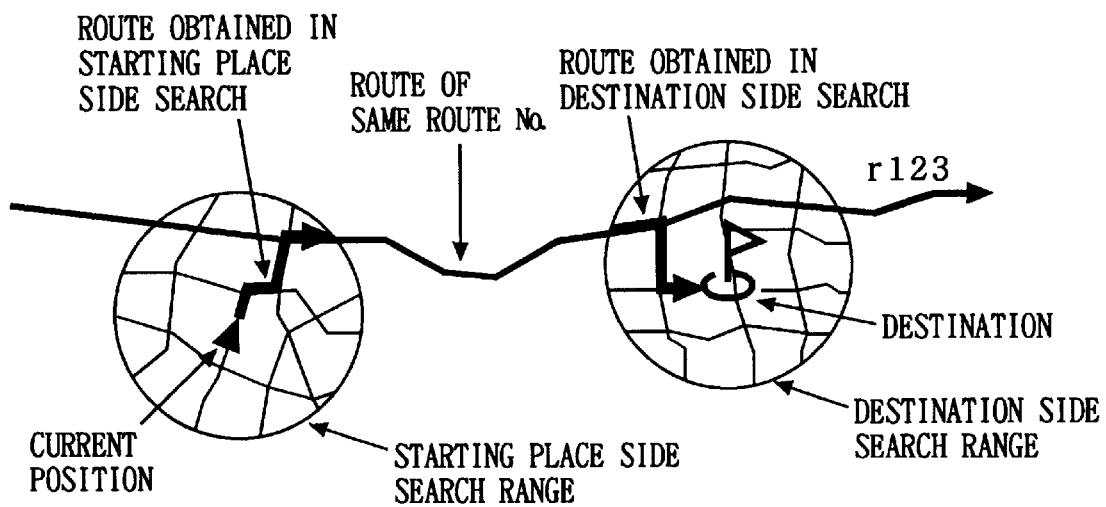
FIG. 27 is adapted to illustrate an operation for selecting a route from a starting place to a destination in the present invention.

The route selection unit 600 shown in FIG. 23 is now described. FIG. 27 is an explanatory diagram showing an exemplary operation concept of the route selection unit 600.

First, a search for the shortest routes to respective spots (including crossings and roads) is carried out in a constant range in the vicinity of the starting place. This search is carried out by a well-known method such as the Dijkstra method. The constant range is that within 5 km or reachable in about 10 minutes from the starting place, for example. The road numbers (r123, for example) of roads going out from the searched range are examined.

Then, a search is carried out in a constant range also in the vicinity of the destination. The road numbers of roads entering this range are examined. If the route numbers examined around the destination and the starting place include the same number, a route for reaching the road having this route number is obtained from the result of the search on the starting place side. In the exterior of the starting place side search range, the road having the same route number is extracted from the route selection data. Finally, the route from the road having the route number to the destination is obtained from the result of the destination side search upon reaching the destination side search range. The three routes {(the starting place→the road having the route number)+(the route number road in the exterior of the starting place side search range→the route number road in the exterior of the destination side search—range)+(the road having the route number→the destination)} are connected with each other, to define the optimum route from the starting place to the destination.

Figure 28:
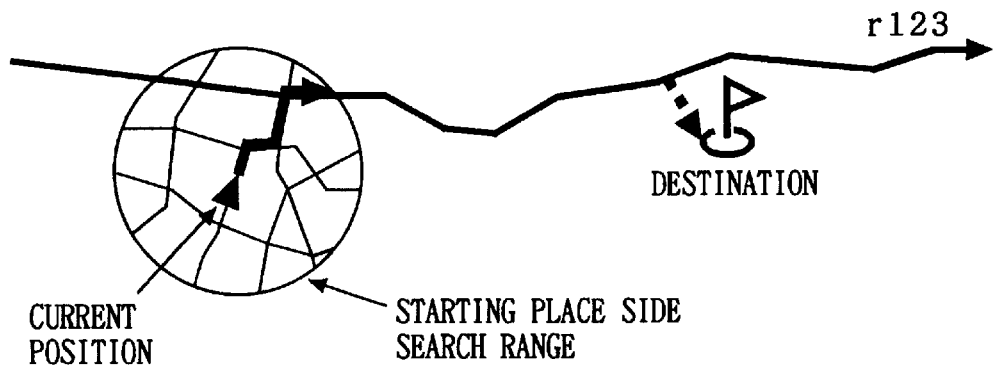
FIG. 28 is adapted to illustrate an operation for selecting a route from the starting place to the vicinity of the destination in the present invention.

In order to quickly select the route in the vicinity of the starting place, the route number of a road reaching the vicinity of the destination may be examined without searching the vicinity of the destination as shown in FIG. 28, to obtain the route from the starting place to the destination. In this case, the vicinity of the destination may be searched later (during traveling, for example), or the same may not absolutely be searched but the road in the vicinity of the destination may be selected by the driver himself. Alternatively, the route number which is in common in the vicinity of the starting place and that of the destination to thereafter search the vicinity of the starting place, thereby obtaining the optimum route from the starting place to the road having the route number.

In order to examine the route numbers of the roads passing through the vicinity of the starting place or the destination, it is necessary to extract roads which are present at constant distances or within constant times from the starting place or the destination and provided with route numbers. When complementary points are provided for the roads having route numbers at constant distances, for example, so that coordinate data or traveling costs are recorded as to the respective complementary points, therefore, it is possible to recognize whether the contemporary points are present at constant distances or within constant times with respect to the starting place or the destination, to enable the aforementioned extraction.

Figure 29A:
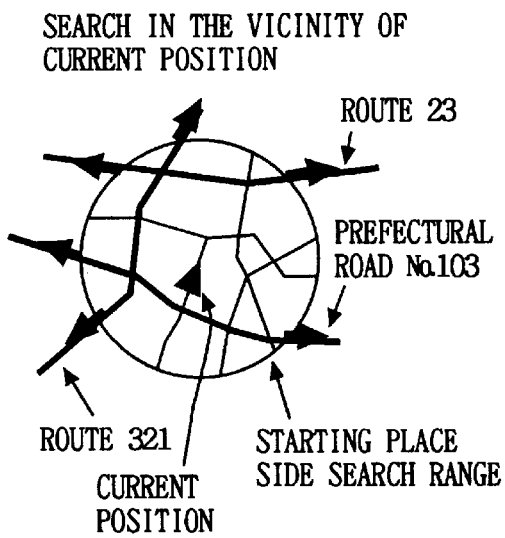
FIGS. 29(A) and 29(B) are adapted to illustrate an operation of the user for selecting a route to be passed.
Figure 29B:
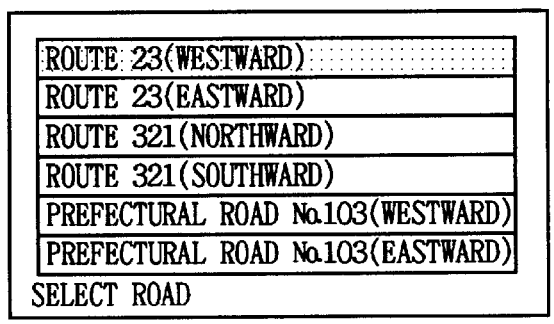

As shown in FIGS. 29(A) and 29(B), further, a constant range from the current position is searched to select links having route numbers going out from the search range, and the road names are displayed on the output unit 900. The user selects the road to be passed through an input unit (not shown). A route for reaching the link of the selected road name from the current position may be obtain ed from the previous search result and displayed. Alternatively, a link having a route number may be simply displayed and selected from the roads in the vicinity of the current position so that the optimum route for reaching the road is thereafter selected. The name of the road to be passed may be inputted by the user. Or, not the road names but roads or routes which can be selected through the output unit 900 may be distinguishedly displayed by changing the colors thereof or blinking the same, so that the user selects the road to be passed.

Figure 30:
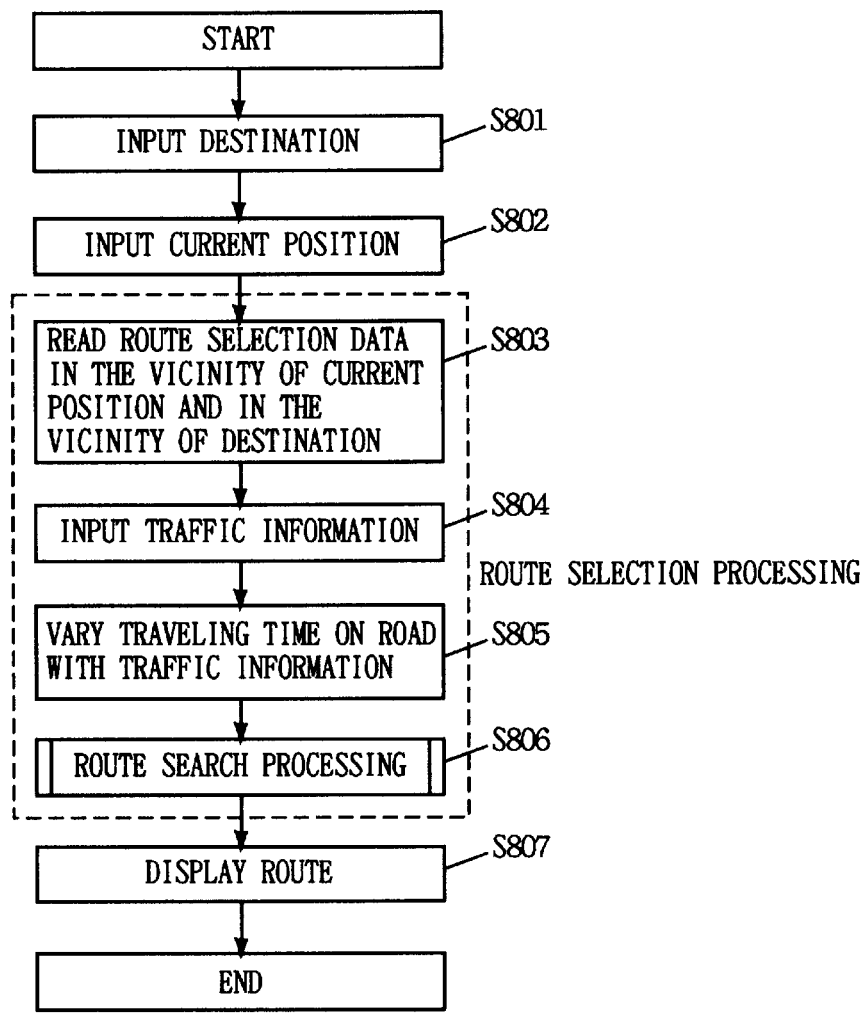
FIG. 30 is a flow chart for illustrating the operation of the route selection system shown in FIG. 23.
Figure 31:
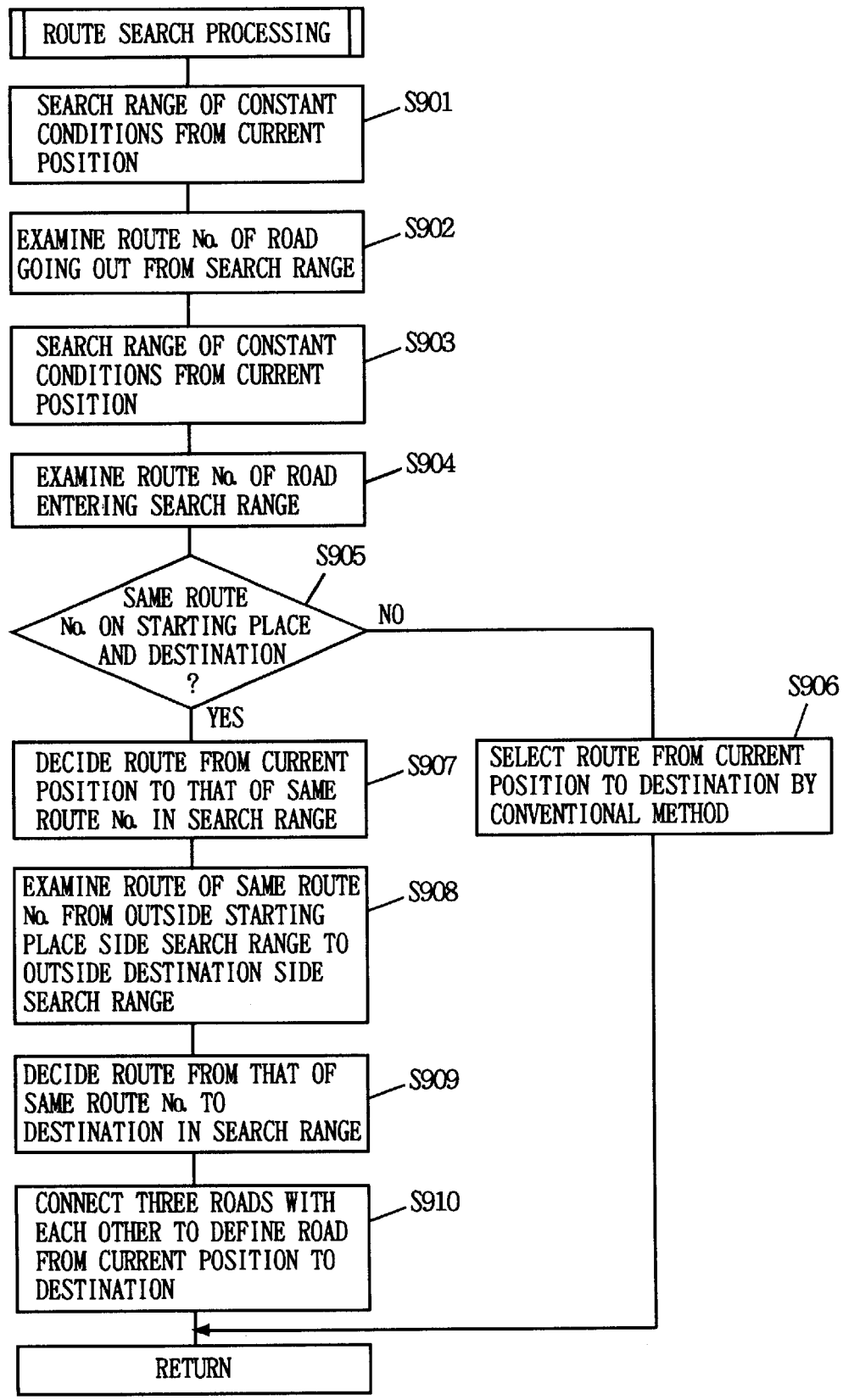
FIG. 31 is a flow chart showing the operation at a subroutine step S806 appearing in FIG. 30 in detail.

FIGS. 30 and 31 are flow charts showing the operation of the route selection system shown in FIG. 23. The route selection operation in the route selection system of FIG. 23 is now described with reference to FIGS. 30 and 31. For example, this method is adapted to select a route for reaching a destination inputted by the user in the minimum traveling time from the current position of the car.

The operation of the route selection unit 600 (steps S801 to S806) is now described. The route selection unit 600 detects that the user operates the spot input unit 500 to input the destination (step S801), and inputs the current position from the position detection unit 200, in order to recognize the current position of the car (step S802). Then, the route selection unit 600 reads route selection data necessary for searching for the route in the vicinity of the current position and that in the vicinity of the destination from the route selection data storage unit 400 in its internal memory (step S803). Then, the route selection unit 600 inputs traffic information data from the traffic information input unit 300 (step S804). Then, the route selection unit 600 calculates traveling times necessary for passing through the respective links of the route selection data read from the route selection data storage unit 400 through the inputted traffic information data, and stores the calculated traveling times in the internal memory while associating the same with the respective links (step S805).

Thus, the internal memory of the route selection unit 600 stores road system data of the route selection data reflecting the traffic information, and route number data. The route selection unit 600 examines the link along which the car currently travels from the coordinates of the current position and its traveling direction through the road system data of the route selection data and the route number data stored in the internal memory, to search for the route having the minimum traveling time to a link in the vicinity of the coordinates of the destination from the link (or a next node) serving as the starting point (step S806). The route search processing at the step S606 is executed by a well-known shortest route search method such as the Dijkstra method, as shown in FIG. 31 in detail.

Referring to FIG. 31, the route selection unit 600 first searches a range having constant conditions from the current position (step S901). Namely, the route selection unit 600 obtains optimum routes to respective nodes (or links) in a range which can be reached within about 10 minutes by the car from the current position, for example, through the shortest route search method. The route selection unit 600 then selects roads which are provided on the boundary between the searched range and an unsearched range and separated from the current position, and examines route numbers recorded for the roads (step S902). Then, the route selection unit 600 makes a search up to a range having constant conditions from the destination (step S903). Namely, the route selection unit 600 obtains optimum routes in a range arrivable at the destination within about 10 minutes from respective nodes (or links) by the car, for example. The route selection unit 600 then selects roads which are provided on the boundary of the searched range and directed to the destination, and examines the route numbers of the roads (step S904).

Then, the route selection unit 600 compares the route numbers obtained at the steps S902 and S904 with each other, to determine whether or not the route numbers include the same one (step S905). If the route numbers include no identical one, the route selection unit 600 selects the optimum route from the current position to the destination by a well-known method which takes time for such route selection (step S906), completes the route search processing and returns to the main routine shown in FIG. 30.

When the same route number (hereinafter referred to as "common route number" is found at the step S905, on the other hand, the route selection unit 600 obtains the optimum route from the current position to the road of the common route number provided on the boundary of the search range on the basis of the result of the search in the vicinity of the current position (step S907). Then, the route selection unit 600 extracts roads having the common route number while reading the route selection data, in order to select a route reaching the boundary of the range searched as to the destination from the boundary of the range searched as to the starting place (step S908). When this extraction reaches a road on the boundary of the range searched as to the destination, the route selection unit 600 obtains the optimum route from the road of the common route number provided on the boundary to the destination on the basis of the result of the search in the vicinity of the destination (step S909). Finally, the route selection unit 600 connects the route from the current position obtained at the step S907, the road extracting the common route number obtained at the step S908 and the route to the destination obtained at the step S909 with each other, and selects the same as the optimum route from the current position to the destination. Thereafter the route selection unit 600 returns to the main routine shown in FIG. 30, displays the selected optimum route on the output unit 900 through the output data generation unit 800 (step S807), and completes its operation.

While the route selection unit 600 employs the Dijkstra method in the aforementioned embodiment, another route search method may alternatively be employed. While the route selection data are read from the route selection data storage unit 400 in advance of the search, a required part of the data may alternatively be read while making the search.

While the starting place or its vicinity and the destination or its vicinity are connected with each other by the roads having the same route number in the aforementioned embodiment, the same may alternatively be connected with a combination of roads having a plurality of route numbers. In this case, relations between the roads of the respective route numbers may be recorded as table data, to readily implement the connection.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A route selection method for selecting an optimum route on a map, comprising:
   a first step of integrating crossings, which satisfy predetermined conditions, with each other in original data which describes a detailed road system having an actual number of crossings, thereby creating route selection data with a reduced number of crossings than the actual number of crossings; and
   a second step of searching for the optimum route between a starting place and a destination as being designated through said route selection data.

2. The route selection method in accordance with claim 1, wherein said route selection data includes:
   road system data which describes the road system after integration of the crossings, and
   a passage link table, which records links that are deleted due to the integration of crossings but are passed in practice, with reference to approach and escape links as to respective crossings that are integrated with each other;
   said second step being adapted to supplement the deleted links with corresponding passage links being described in the passage link table when the optimum route obtained by a search passes through integrated crossings.

3. The route selection method in accordance with claim 2, wherein said first step is adapted to integrate crossings in the original data with each other when a traffic control is present over a plurality of crossings in an actual road system, and
   said passage link table records the traffic control which is applied to crossings which are integrated with each other in relation to the traffic control.

4. The route selection method in accordance with claim 2, wherein the passage link table further records evaluation values in passage of integrated crossings with reference to the approach and escape links, and
   said second step being adapted to search for the optimum route by reading the passage evaluation values corresponding to approach and escape links of integrated crossings from the passage link table and referring thereto.

5. The route selection method in accordance with claim 2, wherein the passage link table further records traffic information provision numbers of integrated crossings with reference to the approach and escape links, and
   said second step being adapted to search for the optimum route in consideration of traffic information which is provided in correspondence to the traffic information provision numbers.

6. The route selection method in accordance with claim 5, wherein the road system being described in the original data is divided into predetermined regions, the traffic information being provided for respective regions,
   the passage link table also records traffic information provision numbers corresponding to regions to which crossings which are integrated with each other beyond boundaries between regions belong before integration of the crossings in road system data in the route selection data, in addition to traffic information provision numbers corresponding to regions to which the crossings belong after the integration.

7. The route selection method in accordance with claim 1, wherein said first step is adapted to integrate a plurality of roads, which are present between two adjacent crossings due to the integration of the crossings, with each other.

8. A route selection system for selecting an optimum route on a map, comprising:
   a route selection data storage means for storing route selection data which are created from original data describing a detailed road system, and which includes a reduced number of crossings by integration of crossings, which satisfy predetermined conditions in the original data, with each other; and
   an optimum route search means for searching for the optimum route between a starting place and a destination as being designated through the route selection data.

9. The route selection system in accordance with claim 8, wherein said route selection data includes:
   road system data which describes the road system after integration of crossings and
   a passage link table, which records links that are deleted by integration of crossings but are passed in practice with reference to approach and escape links as to respective integrated crossings;
   said optimum route search means is for supplementing the deleted links with corresponding passage links being recorded in the passage in table when the optimum route obtained by a search passes through integrated crossings.

10. The route selection system in accordance with claim 9, wherein crossings in the original data are integrated with each other in the route selection data when a traffic control is present over a plurality of crossings in an actual road system, and said passage link table records the traffic control which is applied to crossings which are integrated with each other in relation to the traffic control.

11. The route selection system in accordance with claim 9, wherein the passage link table further records evaluation values in passage of integrated crossings with reference to the approach and escape links, and said optimum route search means searching for the optimum route by reading the passage evaluation values corresponding to approach and escape link of integrated crossings from the passage link table and referring thereto.

12. The route selection system in accordance with claim 9, wherein the passage link table further records traffic information provision numbers of integrated crossings with reference to the approach and escape links, and said optimum route search means is for searching for the optimum route in consideration of traffic information which is provided in correspondence to the traffic information provision numbers.

13. The route selection system in accordance with claim 12, wherein the road system described in the original data is divided into predetermined regions, the traffic information being provided for respective regions, the passage link table also records traffic information provision numbers corresponding to regions to which crossings which are integrated with each other beyond boundaries between regions belong before the integration of the crossings in road system data in the route selection data, in addition to traffic information provision numbers corresponding to regions to which the crossings belong after the integration.

14. The route selection system in accordance with claim 8, wherein a plurality of roads, which are present between two adjacent crossings due to the integration of the crossings, are integrated with each other in the route selection data.

15. A route selection system for selecting an optimum route on a map, comprising:

starting route search means for searching for optimum routes from a starting place to respective spots which are present in a prescribed range and for selecting any one of the optimum routes as a starting route;

output means for outputting the starting route obtained by said starting route search means for guidance; and optimum route search means for searching for an optimum route to a destination after the starting route is outputted from the output means.

16. The route selection system in accordance with claim 15, wherein said starting route search means is for searching for the optimum routes to respective spots which are present in a range which is reachable in a constant time from the starting place, and for selecting any one of the optimum routes as the starting route.

17. The route selection system in accordance with claim 15, wherein said starting route search means is for searching for the optimum routes to respective spots which are present at constant distances from the starting place, and for selecting any one of the optimum routes as the starting route.

18. The route selection system in accordance with claim 15, wherein said starting route search means presumes arrival evaluation values from terminal spots of respective optimum routes obtained by the search to the destination, and for selecting an optimum route having a minimum sum of an arrival evaluation value of the optimum route from the starting place to the terminal spot and the presumed arrival evaluation value from the terminal spot to the destination as the starting route.

19. The route selection system in accordance with claim 18, further comprising storage means for storing starting route decision data, said starting route decision data including arrival evaluation values necessary for traveling along the optimum route between two arbitrary spots as to each of a plurality of spots which are previously picked on the map, said starting route search means presumes the arrival evaluation values from terminal spots of respective optimum routes obtained by the search to the destination on the basis of the starting route decision data being stored in said storage means.

20. The route selection system in accordance with claim 19, wherein the map employed for the route search in said starting route search means and said optimum route search means, is previously divided into units, the starting route decision data assumes spots on roads which are present on boundaries between the units as starting place side spots for storage of the arrival evaluation values, and said starting route search means is for searching for the optimum routes to respective spots which are present in the units including the starting place for selecting any one of the optimum routes as the starting route.

21. The route selection system in accordance with claim 19, wherein said storage means is for storing the arrival evaluation values while reducing the number of destination side spots as compared to starting place side spots.

22. The route selection system in accordance with claim 18, wherein said starting route search means is for obtaining arrival evaluation values necessary for traveling along one-line distances between terminal spots of the optimum routes obtained by the search and the destination for selecting the route having the minimum sum of an arrival evaluation value of the optimum route from the starting place to the terminal spot and the presumed arrival evaluation value from the terminal spot to the destination as the starting route.

23. The route selection system in accordance with claim 15, further comprising storage means for storing starting route decision data, said starting route decision data including information on a spot to be passed for traveling along the optimum route between two arbitrary spots as to each of a plurality of spots which are previously picked on the map, and said starting route search means is for acquiring the optimum route between the starting place and the destination from the starting route decision data, and for regarding a passage spot being included in the optimum route acquired from the starting route decision data as a temporary destination for selecting the starting route among a plurality of optimum routes being obtained by the search.

24. The route selection system in accordance with claim 15, wherein said starting route search means is for selecting a route most approaching the direction of the destination as the starting route among a plurality of optimum routes obtained by said search.

25. The route selection system in accordance with claim 15, wherein said optimum route search means is for searching for a first optimum route from the starting place to the destination, for searching for a second optimum route for reaching said first optimum route from a current position, and for connecting the first and second routes with each other to define the optimum route from the current position to the destination.

26. The route selection system in accordance with claim 25, wherein said optimum route search means is for searching for said second route in a prescribed range from the current position to define a route, between the current position to a spot intersecting with the first route on a boundary of the range, as the second route.

27. The route selection system in accordance with claim 15, wherein said optimum route search means is for searching for the optimum route from a terminal spot of the starting route being obtained by said starting route search means to the destination.

28. The route selection system in accordance with claim 15, wherein said starting route search means is for preparing data which is necessary for the search during a user's operation of setting the destination of the route.

29. A route selection method comprising:
   accessing route selection data which represents a road system and route numbers each of which are arbitrarily set for prescribed roads; and
   obtaining a route from a starting place or its vicinity to a destination or its vicinity on the basis of the route numbers.

30. The route selection method in accordance with claim 29, wherein route numbers of roads passing through the vicinity of the starting place are compared with route numbers of roads passing through the vicinity of the destination so that roads having the same route number are selected as a route connecting the vicinity of the starting place with the vicinity of the destination.

31. The route selection method in accordance with claim 30, wherein an optimum route between the starting place and the road of the selected route number is further searched for.

32. The route selection method in accordance with claim 31, wherein the optimum route between the road of the selected route number and said destination is further searched for.

33. The route selection method in accordance with claim 30, wherein any one road is selected by the user when a plurality of roads having the same route number are found as the result of comparison.

34. The route selection method in accordance with claim 29, wherein optimum routes to respective spots which are present in a predetermined constant range from the starting place are searched for and thereafter route numbers of roads passing through the searched range are compared with route numbers of roads passing through the vicinity of the destination so that, upon finding of roads having a same route number, a combination of (1) the optimum route between the starting place and the road having the same route number, and (2) the road having the same route number, is selected as the route connecting the starting place with the vicinity of the destination.

35. The route selection method in accordance with claim 34, wherein an optimum route between the road of the selected route number and the destination is further searched for.

36. The route selection method in accordance with claim 34, wherein any one road is selected by the user when a plurality of roads having the same route number are found as the result of the comparison.

37. The route selection method in accordance with claim 29, wherein optimum routes to respective spots which are present in a predetermined constant range from the starting place, and optimum routes to respective spots which are present in a predetermined constant range from the destination, are searched for respectively, and thereafter route numbers of roads passing through both searched ranges are compared with each other so that a combination of the optimum route between the starting place and a road having a certain route number and the optimum route between the road having the certain route number and the destination is selected as the route connecting the starting place with the destination upon a finding of roads having the same route number.

38. The route selection method in accordance with claim 37, wherein any one road is selected by the user when a plurality of roads of the same route number are found as the result of the comparison.

39. The route selection method in accordance with claim 29, wherein a user designates a spot to be passed and a route number corresponding to the designated spot is obtained from the route selection data, so that an optimum route between the starting place and a road having the corresponding route number is obtained in the vicinity of the starting place, while the optimum route between the road having the corresponding route number and the destination is obtained in the vicinity of the destination.

40. A route selection system, employing route selection data which represents a road system and predetermined route numbers for prescribed roads, for selecting a route between a starting place and a destination, comprising:
   first search means for searching for optimum routes to respective spots which are present in a predetermined constant range from the starting place;
   second search means for searching for optimum routes to respective spots which are present in a predetermined constant range from the destination;
   comparing means for comparing roads passing both the ranges being searched by said first and second search means with each other; and
   route selection means for selecting a combination of (1) an optimum route between the starting place and a road having a route number, (2) a road having the route number, and (3) the optimum route between the road having the route number and the destination, as the route connecting the starting place with the destination, when roads having a same route number are present as a result of the comparison by said comparing means.

41. The route selection system in accordance with claim 40, further comprising user designation means for making the user designate any one road when a plurality of roads having the same route number are present as the result of the comparison by said comparing means.

42. A route selection system employing route selection data which represents a road system and predetermined route numbers for prescribed roads, for selecting a route from a starting place to a destination, comprising:
   designation means for making the user designate a spot to be passed;
   retrieval means for retrieving a route number corresponding to the spot being designated by said designation means from the route selection data;
   first search means for searching for an optimum route between the starting place and a road having the retrieved route number;

second search means for searching for an optimum route between the road having the retrieved route number and the destination; and route selection means for selecting a combination of the optimum route in a vicinity of the starting place searched for by said first search means, the road having the retrieved route number, and the optimum route in a vicinity of the destination searched for by said second search means, as a route connecting the starting place with the destination.

43. A route selection method comprising:

accessing route selection data which represents a road system and predetermined route numbers which are set for a plurality of continuous roads which become one route; and obtaining a route from a starting place or its vicinity to a destination or its vicinity on the basis of the route numbers without searching on parts of the plurality of continuous roads for which the route numbers are set.

* * * * *